United States Patent
Ghouti et al.

(10) Patent No.: US 8,189,775 B2
(45) Date of Patent: May 29, 2012

(54) METHOD OF PERFORMING CIPHER BLOCK CHAINING USING ELLIPTIC POLYNOMIAL CRYPTOGRAPHY

(75) Inventors: Lahouari Ghouti, Dhahran (SA); Mohammad K. Ibrahim, Leicester (GB); Adnan A. Gutub, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 309 days.

(21) Appl. No.: 12/656,906

(22) Filed: Feb. 18, 2010

(65) Prior Publication Data

US 2011/0200188 A1    Aug. 18, 2011

(51) Int. Cl.
*H04K 1/04* (2006.01)
*H04K 1/06* (2006.01)
(52) U.S. Cl. .................................................... 380/37
(58) Field of Classification Search ............ 380/43
See application file for complete search history.

(56) References Cited

U.S. PATENT DOCUMENTS

| | | | |
|---|---|---|---|
| 4,200,770 A | 4/1980 | Hellman et al. | |
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 5,651,069 A | 7/1997 | Rogaway | |
| 5,892,829 A | 4/1999 | Aiello et al. | |
| 6,128,737 A | 10/2000 | Jakubowski et al. | |
| 6,424,712 B2 * | 7/2002 | Vanstone et al. ............... | 380/28 |
| 6,816,594 B1 | 11/2004 | Okeya | |
| 6,876,745 B1 | 4/2005 | Kurumatani | |
| 7,050,580 B1 | 5/2006 | Ferre Herrero | |
| 7,190,787 B1 | 3/2007 | Graunke et al. | |
| 7,308,469 B2 | 12/2007 | Harley et al. | |
| 7,319,751 B2 | 1/2008 | Kirichenko | |
| 7,483,533 B2 * | 1/2009 | Ibrahim ......................... | 380/44 |
| 7,483,534 B2 * | 1/2009 | Ibrahim ......................... | 380/44 |
| 2003/0072443 A1 | 4/2003 | Harley et al. | |
| 2003/0108196 A1 | 6/2003 | Kirichenko | |
| 2004/0091105 A1 | 5/2004 | Kim et al. | |
| 2004/0223609 A1 | 11/2004 | Wu | |
| 2006/0029220 A1 | 2/2006 | Ibrahim | |
| 2006/0029221 A1 | 2/2006 | Ibrahim | |
| 2006/0098814 A1 | 5/2006 | Al-Khoraidly et al. | |
| 2008/0080710 A1 | 4/2008 | Harley et al. | |

(Continued)

FOREIGN PATENT DOCUMENTS

EP    0874307    10/1998

(Continued)

*Primary Examiner* — Edan Orgad
*Assistant Examiner* — Harris Wang
(74) *Attorney, Agent, or Firm* — Richard C. Litman

(57) ABSTRACT

The method of performing cipher block chaining using elliptic polynomial cryptography allows for the encryption of messages through elliptic polynomial cryptography and, particularly, with the utilization of cipher block chaining based upon both the elliptic polynomial and its twist, regardless of whether the elliptic polynomial and its twist are isomorphic with respect to one another. The method of performing cipher block chaining is based on the elliptic polynomial discrete logarithm problem. It is well known that an elliptic polynomial discrete logarithm problem is a computationally "difficult" or "hard" problem.

6 Claims, 1 Drawing Sheet

U.S. PATENT DOCUMENTS

| | | |
|---|---|---|
| 2008/0215658 A1 | 9/2008 | Gura et al. |
| 2009/0136022 A1 | 5/2009 | Langendoerfer et al. |
| 2009/0185677 A1* | 7/2009 | Bugbee .................... 380/28 |
| 2010/0166174 A1* | 7/2010 | Ghouti et al. ............... 380/28 |
| 2010/0166176 A1* | 7/2010 | Ghouti et al. ............... 380/29 |
| 2010/0169644 A1* | 7/2010 | Ghouti et al. ............. 713/169 |
| 2010/0177890 A1* | 7/2010 | Ghouti et al. ............... 380/30 |
| 2011/0200185 A1* | 8/2011 | Ghouti et al. ............... 380/28 |
| 2011/0200187 A1* | 8/2011 | Ghouti et al. ............... 380/43 |
| 2011/0202773 A1* | 8/2011 | Ghouti et al. ............. 713/183 |

FOREIGN PATENT DOCUMENTS

| | | |
|---|---|---|
| EP | 0892520 | 1/1999 |
| EP | 1215642 | 6/2002 |
| WO | WO9904332 | 1/1999 |

* cited by examiner

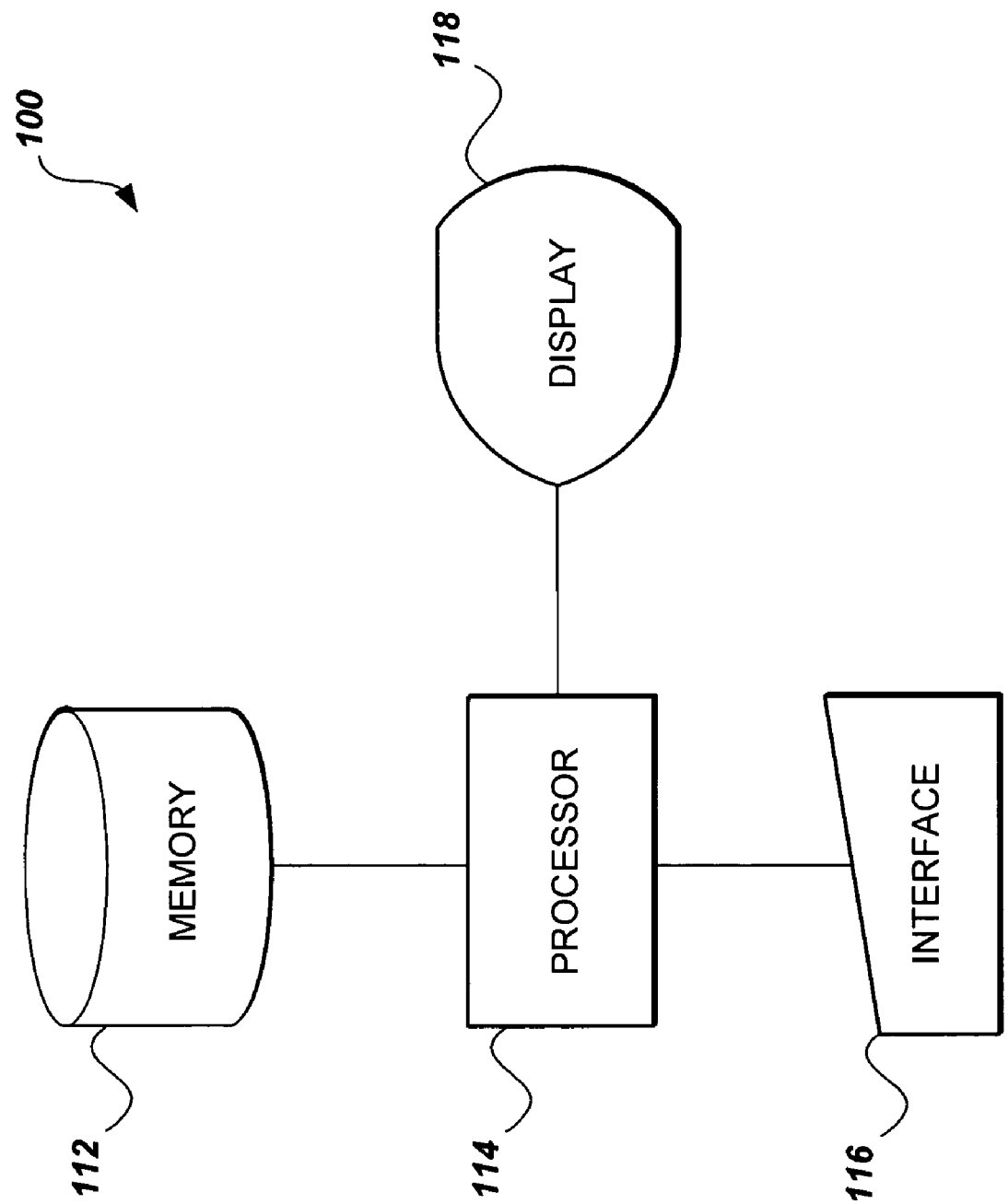

METHOD OF PERFORMING CIPHER BLOCK CHAINING USING ELLIPTIC POLYNOMIAL CRYPTOGRAPHY

BACKGROUND OF THE INVENTION

1. Field of the Invention

The present invention relates to computerized cryptographic methods for communications in a computer network or electronic communications system, and particularly to a method of performing cipher block chaining using elliptic polynomial cryptography based upon the elliptic polynomial discrete logarithm problem.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

Methods of adapting discrete-logarithm based algorithms to the setting of elliptic curves are known. However, finding discrete logarithms in this kind of group is particularly difficult. Thus, elliptic curve-based crypto algorithms can be implemented using much smaller numbers than in a finite-field setting of comparable cryptographic strength. Therefore, the use of elliptic polynomial cryptography is an improvement over finite-field based public-key cryptography.

Block ciphers are presently the most popular algorithms in use for providing data privacy. Block ciphers with a block size n and a key size k can be viewed as a family of permutations on the set of all n-bit strings, indexed by k-bit long encryption keys and possessing certain properties.

Some of the properties that are typically required of block ciphers are simplicity of construction and security. With regard to security, it is usually assumed that the underlying block cipher is secure and that the key size k is chosen so that an exhaustive key search is computationally infeasible. In practice, there are two issues to be considered with respect to security: (i) for a randomly chosen key k, it appears as a random permutation on the set of n-bit strings to any computationally bounded observer (i.e., one who does not have an unlimited amount of processing power available) who does not know k and who can only see encryption of a certain number of plaintexts x of their choice; and (ii) to achieve a so-called semantic security which is resistant to collision attacks such as birthday and meet-in-the-middle attacks. Such attacks have been proven to reduce an exhaustive key search significantly against block ciphers. In practice, most data units (including any typical file, database record, IP packet, or email message) which require encryption are greater in length than the block size of the chosen cipher. This will require the application of the block cipher function multiple times. The encryption of many plaintext blocks under the same key, or the encryption of plaintexts having identical parts under the same key may leak information about the corresponding plaintext. In certain situations, it is impossible to achieve semantic security. The goal then is to leak the minimum possible amount of information.

A further property is scalability. Obviously, no block cipher can be secure against a computationally unbounded attacker capable of running an exhaustive search for the unknown value of k. Furthermore, the development of faster machines will reduce the time it takes to perform an exhaustive key search. There is always a demand for more secure ciphers. It will be advantageous to develop a block cipher which is scalable so that an increase in security can be achieved by simply changing the length of the key rather than changing the block cipher algorithm itself.

Another property is efficiency. It is obvious that block ciphers are made computationally efficient to encrypt and decrypt to meet the high data rates demands of current applications such as in multimedia. Furthermore, since speed of execution is also important, it is advantageous to have block cipher that can be implemented in parallel. Of further interest is random access. Some modes allow encrypting and decrypting of any given block of the data in an arbitrary message without processing any other portions of the message.

Keying material is also an important factor in block ciphers. Some modes require two independent block cipher keys, which leads to additional key generation operations, a need for extra storage space or extra bits in communication. Additionally, of interest, are counter/IV/nonce requirements. Almost all modes make use of certain additional values together with block cipher key(s). In certain cases, such values must be generated at random or may not be reused with the same block cipher key to achieve the required security goals. Further, pre-processing capability is another important factor in block ciphers The Data Encryption Standard (DES) is a public standard and is presently the most popular and extensively used system of block encryption. DES was adopted as a federal government standard in the United States in 1977 for the encryption of unclassified information. The rapid developments in computing technology in recent years, in particular the ability to process vast amounts of data at high speed, meant that DES could not withstand the application of brute force in terms of computing power. In the late 1990's, specialized "DES cracker" machines were built that could recover a DES key after a few hours by trying possible key values. As a result, after 21 years of application, the use of DES was discontinued by the United States in 1998.

A new data encryption standard called Advanced Encryption Standard (AES) was launched in 2001 in the United States, and it was officially approved with effect from 26 May 2002. However, AES has no theoretical or technical innovation over its predecessor, DES. The basic concept remains the same and, essentially, all that has changed is that the block size n has been doubled. The AES standard specifies a block size of 128 bits and key sizes of 128, 192 or 256 bits. Although the number of 128-bit key values under AES is about $10^{21}$ times greater than the number of 56-bit DES keys, future advances in computer technology may be expected to compromise the new standard in due course. Moreover, the increase in block size may be inconvenient to implement.

Furthermore, AES is not based on known computationally hard problems, such as performing factorization or solving a discrete logarithm problem. It is known that encryption methods that are based on known cryptographic problems are usually stronger than those that are not based on such problems. Also, AES provides a limited degree of varying security, 128-bits, 192-bits and 256-bits; i.e., it not truly scalable. It should noted that to have a cipher with a higher degree of security, the cipher would probably need a completely new algorithm which will make the hardware for AES redundant. As a clear example, the hardware for DES cannot be used efficiently for AES. Also, the hardware of the 192-bits AES cipher is not completely compatible with the hardware of the other two ciphers 128-bits and 256-bits.

There are many ways of encrypting data stream that are longer than a block size, where each is referred to as a "mode of operation". Two of the standardized modes of operation employing DES are Electronic Code Book (ECB), and Cipher Block Chaining (CBC). It should be noted that the security of a particular mode should in principle be equivalent to the security of the underlying cipher. For this, we need to show that a successful attack on the mode of operation gives us almost an equally successful attack on the underlying cipher.

With regard to the ECB mode, in order to encrypt a message of arbitrary length, the message is split into consecutive n-bit blocks, and each block is encrypted separately. Encryption in ECB mode maps identical blocks in plaintext to identical blocks in ciphertext, which obviously leaks some information about plaintext. Even worse, if a message contains significant redundancy and is sufficiently long, the attacker may get a chance to run statistical analysis on the ciphertext and recover some portions of the plaintext. Thus, in some cases, security provided by ECB is unacceptably weak. ECB may be a good choice if all is need is protection of very short pieces of data or nearly random data. A typical use case for ECB is the protection of randomly generated keys and other security parameters.

With regard to CBC mode, in this mode the exclusive- or (XOR) operation is applied to each plaintext block and the previous ciphertext block, and the result is then encrypted. An n-bit initialization vector IV is used to encrypt the very first block. Unlike ECB, CBC hides patterns in plaintext. In fact, it can be proved that there is a reduction of security of CBC mode to security of the underlying cipher provided that IV is chosen at random. The computational overhead of CBC is just a single XOR operation per block encryption/decryption, so its efficiency is relatively good. Further, CBC provides random read access to encrypted data; i.e., to decrypt the i-th block, we do not need to process any other blocks. However, any change to the i-th message block would require re-encryption of all blocks with indexes greater than i. Thus, CBC does not support random write access to encrypted data.

The most serious drawback of CBC is that it has some inherent theoretical problems. For example, if $M_i$ denotes the i-th plaintext block and $C_i$ denotes the i-th ciphertext block, if one observes in a ciphertext that $C_i = C_j$, it immediately follows that $M_i$ XOR $M_j = C_{i-1}$ XOR $C_{j-1}$, where the right-hand side of the equation is known. This is called the "birthday" or matching ciphertext attack. Of course, if the underlying cipher is good in the sense of pseudorandom permutation, and its block size is sufficiently large, the probability of encountering two identical blocks in ciphertext is very low.

Another example of its security weakness is its use of XOR-based encryption. A further drawback of CBC is that its randomization must be synchronized between the sending and the receiving correspondent. CBC uses an initialization vector that must be generated at random. This initialization vector must be synchronized between the sending and receiving correspondent for correct decryption.

From the above, it is clear that the security of encrypting a sequence of message blocks using a block cipher depends on two aspects: the security of the underlying block cipher; and the effectiveness of the randomization used in reducing collision attacks when encrypting a sequence of blocks.

With regard to the security of the underlying block cipher, it is known that encryption methods that are based on computationally hard problems, such as performing factorization or solving a discrete logarithm problem, are usually stronger than those that are not based on such problems. Integer factorization can be formulated as follows: For an integer n that is the product of two primes p and q, the problem is to find the values of p and q given n only. The problem becomes harder for larger primes. The discrete logarithm problem can be formulated as follows: Given a value g and a value y whose value is equal to $g^k$ defined over a group, find the value of k. The problem becomes harder for larger groups. Although the applications of integer factorization and discrete logarithm problems in designing block ciphers is known, the resulting ciphers are computationally more demanding than those currently used, such as AES.

With regard to the effectiveness of randomization and semantic security, the one-time pad is the only unconditionally semantically secure cipher presently in use. With the one-time pad, the sequence of keys does not repeat itself. In other words, it is said to have an infinite cycle. However, since the sending and the receiving correspondents have to generate the same random sequence, the one-time pad is impractical because of the long sequence of the non-repeating key. As a consequence, the keys to encrypt and decrypt in all private-key systems, including block ciphers, remain unchanged for every message block, or they are easily derived from each other by inference using identical random number generators at the sending and receiving correspondent. Furthermore, these generators must be initialized to the same starting point at both correspondents to ensure correct encryption and decryption. This is true of all the existing block ciphers, including the RNS encryption and decryption method discussed above.

Many methods have been proposed to construct a pseudo-random number generator or adaptive mechanisms for pseudo-random generation of permutations. Such methods include those based on tables that are used to increase randomization. However, no matter how good the randomization property of the underlying generator, it always has a finite number of states and, hence, the numbers generated by existing generators have a finite cycle where a particular sequence is repeated one cycle after other. Therefore, such block ciphers are vulnerable to collision attacks. Thus, the security of such block ciphers is very much dependant on the randomness of the random number generator. The RNS encryption and decryption method described above is not an exception. As a consequence, one can conclude that semantic insecurity is inherent in all existing block ciphers, but with varying degrees.

In the following, existing ciphers where both the sending and the receiving correspondents have to generate the same random sequence will be referred to as synchronized-randomization ciphers. Synchronized-randomization is achieved under the control of a key or some form of an initialization mechanism. Starting from this initial value, the subsequent keys are easily obtained by some form of a random number generator. Therefore, synchronized-randomization between encryption and decryption is guaranteed as long as identical random number generators are used by both correspondents and as long as the generators at both correspondents are synchronized to start from the same initial state. Thus, no unilateral change in the randomization method is allowed in synchronized-randomization.

In practice, an elliptic curve group over a finite field F is formed by choosing a pair of a and b coefficients, which are elements within F. The group consists of a finite set of points $P(x,y)$ which satisfy the elliptic curve equation $F(x,y)=y^2-x^3-ax-b=0$, together with a point at infinity, O. The coordinates of the point, x and y, are elements of F represented in N-bit strings. In the following, a point is either written as a capital letter (e.g., point $P_j$ or as a pair in terms of the affine coordinates; i.e. (x,y).

The elliptic curve cryptosystem relies upon the difficulty of the elliptic polynomial discrete logarithm problem (ECDLP) to provide its effectiveness as a cryptosystem. Using multiplicative notation, the problem can be described as: given points B and Q in the group, find a number k such that $B^k=Q$; where k is the discrete logarithm of Q to the base B. Using additive notation, the problem becomes: given two points B and Q in the group, find a number k such that $kB=Q$.

In an elliptic curve cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor which determines the security strength of such a system is the size of its underlying finite field. In a real cryptographic application, the underlying field is made so large that it is computationally infeasible to determine k in a straightforward way by computing all the multiples of B until Q is found.

At the heart of elliptic curve geometric arithmetic is scalar multiplication, which computes kB by adding together k copies of the point B. Scalar multiplication is performed through a combination of point-doubling and point-addition operations. The point-addition operations add two distinct points together and the point-doubling operations add two copies of a point together. To compute, for example, $B=(2*(2*(2B)))+2B=Q$, it would take three point-doublings and two point-additions.

Addition of two points on an elliptic curve is calculated as follows: when a straight line is drawn through the two points, the straight line intersects the elliptic curve at a third point. The point symmetric to this third intersecting point with respect to the x-axis is defined as a point resulting from the addition. Doubling a point on an elliptic curve is calculated as follows: when a tangent line is drawn at a point on an elliptic curve, the tangent line intersects the elliptic curve at another point. The point symmetric to this intersecting point with respect to the x-axis is defined as a point resulting from the doubling. Table 1 illustrates the addition rules for adding two points $(x_1,y_1)$ and $(x_2,y_2)$; i.e., $(x_3,y_3)=(x_1,y_1)+(x_2,y_2)$:

TABLE 1

Summary of Addition Rules: $(x_3, y_3) = (x_1, y_1) + (x_2, y_2)$

| | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling <br> $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_2, y_2)) = O$ |
| $(x_2, y_2) = O$ | $(x_3, y_3) = (x_1, y_1) + O = (x_1, y_1) =$ |
| $-(x_1, y_1)$ | $= (x_1, -y_1)$ |

For elliptic curve encryption and decryption, given a message point $(x_m,y_m)$, a base point $(x_B,y_B)$, and a given key, k, the cipher point $(x_C,y_C)$ is obtained using the equation $(x_C,y_C)=(x_m,y_m)+k(x_B,y_B)$.

There are two basics steps in the computation of the above equations. The first step is to find the scalar multiplication of the base point with the key, $k(x_B,y_B)$. The resulting point is then added to the message point, $(x_m,y_m)$ to obtain the cipher point. At the receiver, the message point is recovered from the cipher point, which is usually transmitted, along with the shared key and the base point $(x_m,y_m)=(x_C,y_C)-k(x_B,y_B)$.

As noted above, the x-coordinate, $x_m$, is represented as an N-bit string. However, not all of the N-bits are used to carry information about the data of the secret message. Assuming that the number of bits of the x-coordinate, $x_m$, that do not carry data is L, then the extra bits L are used to ensure that message data, when embedded into the x-coordinate, will lead to an $x_m$, value which satisfies the elliptic curve equation (1). Typically, if the first guess of $x_m$ is not on a curve, then the second or third try will be.

Thus, the number of bits used to carry the bits of the message data is (N−L). If the secret data is a K-bit string, then the number of elliptic curve points needed to encrypt the K-bit data is $$\left\lceil \frac{K}{N-L} \right\rceil.$$

It is important to note that the y-coordinate, $y_m$, of the message point carries no data bits.

Given a cubic equation in x defined over a finite field, F(p), of the form, $t=x^3+ax+b$, where $x \in F(p)$ $t \in F(p)$ $a \in F(p)$ and $b \in F(p)$, then any value of x will lead to a value of $t \in F(p)$. It should be noted that t could be either quadratic residue or non-quadratic residue. If t is quadratic residue, it can be written as $t=y^2$, and if t is non-quadratic residue, it can be written as $t=\bar{\alpha}y^2$ where $\bar{\alpha}$ is a non quadratic element of F(p); i.e., $\sqrt{\bar{\alpha}} \notin F(p)$. Thus, equation (5), can be written as $\alpha y^2$ $\alpha y^2=x^3+ax+b$, where $\alpha=1$ if t is quadratic residue, and $\alpha=\bar{\alpha}$ if t is non-quadratic residue.

It should be noted that for a specific coefficient $a,b \in F(p)$ that when $\alpha=1$, the resulting curve is an elliptic curve. However, if $\alpha=\bar{\alpha}$, this leads to a twist of the elliptic curve obtained with $\alpha=1$. Thus, any value of $x \in F(p)$ will lead to a point $(x, \sqrt{\alpha}y)$ which is either on an elliptic curve or its twist. If $\alpha=1$, the point $(x, \sqrt{\alpha}y)$ is on the elliptic curve. If $\alpha=\bar{\alpha}$, the point $(x, \sqrt{\alpha}y)$ is on its twist.

Elliptic points can be formulated on a twist of an elliptic curve in the same fashion as they are formulated for elliptic curves. As result, elliptic polynomial cryptography can also be defined on twists of elliptic curves in the same manner as that described above. Equations for point addition on an elliptic curve or its twist are given in Table 2 below. If $\alpha=1$, the equations are for point addition on an elliptic curve, and when $\alpha=\bar{\alpha}$, the equations are for point addition on its twist.

TABLE 2

Summary of Addition Rules on elliptic curves or their twists:
$(x_3, \sqrt{\alpha}y_3) = (x_1, \sqrt{\alpha}y_1) + (x_2, \sqrt{\alpha}y_2)$

| | |
|---|---|
| General Equations | $x_3 = m^2 - x_2 - x_1$ <br> $\sqrt{\alpha}y_3 = m(x_3 - x_1) + \sqrt{\alpha}y_1$ |
| Point Addition | $m = \sqrt{\alpha} \dfrac{y_2 - y_1}{x_2 - x_1}$ |
| Point Doubling <br> $(x_3, y_3) = 2(x_1, y_1)$ | $m = \dfrac{3x_1^2 - a}{2\sqrt{\alpha}\, y_1}$ |
| $(x_2, \sqrt{\alpha}y_2) = -(x_1, \sqrt{\alpha}y_1)$ <br> $(x_2, \sqrt{\alpha}y_2) = O$ <br> $-(x_1, \sqrt{\alpha}y_1)$ | $(x_3, \sqrt{\alpha}y_3) = (x_1, \sqrt{\alpha}y_1) + (-(x_2, \sqrt{\alpha}y_2)) = O$ <br> $(x_3, \sqrt{\alpha}y_3) = (x_1, \sqrt{\alpha}y_1) + O = (x_1, \sqrt{\alpha}y_1)$ <br> $= (x_1, \sqrt{\alpha}y_1)$ |

Encryption and decryption equation are modified accordingly: $(x_C, \sqrt{\alpha}y_C) = (x_m, \sqrt{\alpha}y_m) + k(x_B, \sqrt{\alpha}y_B)$, and $(x_m, \sqrt{\alpha}y_m) = (x_C, \sqrt{\alpha}y_C) - k(x_B, \sqrt{\alpha}y_B)$.

When $\alpha=1$, the equations are the cryptography equations over an elliptic curve, and when $\alpha=\bar{\alpha}$, they define the cryptography equations over its twist. An attack method referred to as power analysis exists, in which the secret information is decrypted on the basis of leaked information. An attack method in which change in voltage is measured in cryptographic processing using secret information, such as DES (Data Encryption Standard) or the like, such that the process of the cryptographic processing is obtained, and the secret information is inferred on the basis of the obtained process is known.

An attack method, referred to as power analysis exists, in which the secret information is decrypted on the basis of leaked information. An attack method in which change in voltage is measured in cryptographic processing using secret information, such as DES (Data Encryption Standard) or the like, such that the process of the cryptographic processing is obtained, and the secret information is inferred on the basis of the obtained process is known.

As one of the measures against power analysis attack on elliptic curve cryptosystems, a method using randomized projective coordinates is known. This is a measure against an attack method of observing whether a specific value appears or not in scalar multiplication calculations, and inferring a scalar value from the observed result. By multiplication with a random value, the appearance of such a specific value is prevented from being inferred.

In the above-described elliptic curve cryptosystem, attack by power analysis, such as DPA or the like, was not taken into consideration. Therefore, in order to relieve an attack by power analysis, extra calculation has to be carried out using secret information in order to weaken the dependence of the process of the cryptographic processing and the secret information on each other. Thus, time required for the cryptographic processing increases so that cryptographic processing efficiency is lowered.

With the development of information communication networks, cryptographic techniques have been indispensable elements for the concealment or authentication of electronic information. Efficiency in terms of computation time is a necessary consideration, along with the security of the cryptographic techniques. The elliptic polynomial discrete logarithm problem is so difficult that elliptic curve cryptosystems can make key lengths shorter than that in Rivest-Shamir-Adleman (RSA) cryptosystems, basing their security on the difficulty of factorization into prime factors. Thus, the elliptic curve cryptosystems offer comparatively high-speed cryptographic processing with optimal security. However, the processing speed is not always high enough to satisfy smart cards, for example, which have restricted throughput or servers which have to carry out large volumes of cryptographic processing.

The pair of equations for m in Table 1 are referred to as "slope equations". Computation of a slope equation in finite fields requires one finite field division. Alternatively, the slope computation can be computed using one finite field inversion and one finite field multiplication. Finite field division and finite field inversion are costly in terms of computational time because they require extensive CPU cycles for the manipulation of two elements of a finite field with a large order. Presently, it is commonly accepted that a point-doubling and a point-addition operation each require one inversion, two multiplications, a square, and several additions. At present, there are techniques to compute finite field division and finite field inversion, and techniques to trade time-intensive inversions for multiplications through performance of the operations in projective coordinates.

In cases where field inversions are significantly more time intensive than multiplication, it is efficient to utilize projective coordinates. An elliptic curve projective point (X,Y,Z) in conventional projective (or homogeneous) coordinates satisfies the homogeneous Weierstrass equation: $\tilde{F}(X,Y,Z) = Y^2 Z - X^3 - aXZ^2 - bZ^3 = 0$, and, when $z \neq 0$, it corresponds to the affine point $$(x, y) = \left( \frac{X}{Z}, \frac{Y}{Z} \right).$$

Other projective representations lead to more efficient implementations of the group operation, such as, for example, the Jacobian representations, where the triplets (X,Y,Z) correspond to the affine coordinates $$(x, y) = \left( \frac{X}{Z^2}, \frac{Y}{Z^3} \right)$$

whenever $z \neq 0$. This is equivalent to using a Jacobian elliptic curve equation that is of the form $\tilde{F}_J(X,Y,Z) = Y^2 - X^3 - aXZ^4 - bZ^6 = 0$.

Another commonly used projection is the Chudnovsky-Jacobian coordinate projection. In general terms, the relationship between the affine coordinates and the projection coordinates can be written as $$(x, y) = \left(\frac{X}{Z^i}, \frac{Y}{Z^j}\right)$$

where the values of i and j depend on the choice of the projective coordinates. For example, for homogeneous coordinates, i=1 and j=1.

The use of projective coordinates circumvents the need for division in the computation of each point addition and point doubling during the calculation of scalar multiplication. Thus, finite field division can be avoided in the calculation of scalar multiplication, $$k\left(\frac{X_B}{Z_B^i}, \frac{Y_B}{Z_B^j}\right),$$

when using projective coordinates.

The last addition for the computation of the cipher point, $$\left(\frac{X_C}{Z_C^i}, \frac{Y_C}{Z_C^j}\right);$$

i.e., the addition of the two points $$\left(\frac{X_m}{Z_m^i}, \frac{Y_m}{Z_m^j}\right) \text{ and } k\left(\frac{X_B}{Z_B^i}, \frac{Y_B}{Z_B^j}\right),$$

can also be carried out in the chosen projection coordinate:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right).$$

It should be noted that $Z_m=1$.

However, one division (or one inversion and one multiplication) must still be carried out in order to calculate $$x_c = \frac{X_C}{Z_C^i},$$

since only the affine x-coordinate of the cipher point, $x_C$, is sent by the sender.

Thus, the encryption of (N−L) bits of the secret message using elliptic curve encryption requires at least one division when using projective coordinates. Similarly, the decryption of a single message encrypted using elliptic polynomial cryptography also requires at least one division when using projective coordinates.

Thus, a method of performing cipher block chaining using elliptic polynomial cryptography solving the aforementioned problems is desired.

SUMMARY OF THE INVENTION

The method of performing cipher block chaining using elliptic polynomial cryptography allows for the encryption of messages through elliptic polynomial cryptography and, particularly, with the utilization of cipher block chaining based upon both the elliptic polynomial and its twist, regardless of whether the elliptic polynomial and its twist are isomorphic with respect to one another. The method of performing cipher block chaining is based on the elliptic polynomial discrete logarithm problem. It is well known that an elliptic polynomial discrete logarithm problem is a computationally "difficult" or "hard" problem. The method includes the following steps:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ and a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in TEC^{nx+ny+2}$;

the sending correspondent then performs the following steps:

c) embedding a bit string of the secret key into the (nx+1) x-coordinates $x_0, x_1, \ldots x_{nx}$ and the ny y-coordinates $y_1, \ldots, y_{ny}$, of a key elliptic point $(x_0, x_1, \ldots x_{nx,k}, \sqrt{\alpha_k}y_0, y_1, \ldots y_{nx,k})$;

d) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, wherein $\alpha_k=1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{nx,k})$, wherein
if $\alpha_k=\alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

e) embedding the message (nx+ny+1) N-bit string of an initial block, which is referred to as the 0-th block, into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

f) computing a set of cipher points as
$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, y_{ny,S_0})$
and
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, y_{ny,TS_0})$
if the message point of the 0-th block is on the elliptic polynomial, where $\alpha_{m_0}=1$, wherein if otherwise, the set of cipher points are computed as
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha}y_{0,m_0}, y_{1,m_0}, \ldots, y_{ny,m_0}) + (x_{0,TS_0}, x_{1,TS_0}, \ldots, x_{nx,TS_0}, y_{0,TS_0}, y_{1,TS_0}, \ldots, y_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, y_{ny,S_0})$;

g) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent, together with any other information needed to recover the message point without sacrificing security if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent, together with any other information needed to recover the message point without sacrificing security;

h) establishing integers i and u and iteratively repeating the following steps i) through k) until i>u:

i) embedding the message (nx+ny+1) N-bit string of an i-th block into the (nx+1) x-coordinates $x_0, x_1, \ldots, x_{nx}$, and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

j) computing the set of cipher points as
$(x_{0,c_i}, x_{1,c_i}, \ldots, x_{nx,c_i}, y_{0,c_i}, y_{1,c_i}, \ldots, y_{ny,c_i}) =$
$(x_{0,m_i}, x_{1,m_i}, \ldots, x_{nx,m_i}, y_{0,m_i}, y_{1,m_i}, \ldots, y_{ny,m_i})$
$+ (x_{0,c_{i-1}}, x_{1,c_{i-1}}, \ldots, x_{nx,c_{i-1}}, y_{0,c_{i-1}}, y_{1,c_i}, \ldots, y_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_i}, \ldots, y_{ny,Tc_{i-1}})$
if the message point of the i-th block is on the elliptic polynomial, where $\alpha_{m_i}=1$, wherein if otherwise, the set of cipher points are computed as
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,m_i}, x_{1,m_i}, \ldots, x_{nx,m_i}, \sqrt{\alpha}y_{0,m_i}, y_{1,m_i}, \ldots, y_{ny,m_i})$
$+ (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_i}, \ldots, y_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_i}, \ldots, y_{ny,c_{i-1}})$;

k) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent, together with any other information needed to recover the message point without sacrificing security if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,c_i})$ are sent to the receiving correspondent, together with any other information needed to recover the message point without sacrificing security;

the receiving correspondent then performs the following steps:

l) embedding the bit string of the secret key into the (nx+1) x-coordinates $x_0, x_1, \ldots, x_{nx}$ and the ny y-coordinates $y_1, \ldots, y_{ny}$ of the key elliptic point $(x_{0,k}, x_{1,k}, \ldots, x_{nx,k}, \sqrt{\alpha_k}y_{0,k}, y_{1,k}, \ldots, y_{ny,k})$;

m) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) =$
$k(x_{0,TB}, x_{1,TB}, \ldots, x_{nx,TB}, \sqrt{\alpha}y_{0,B}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, where $\alpha_k=1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{nx,k})$, wherein
if $\alpha_k=\alpha$ then computing a scalar multiplication
$(x_{0,S_0}, x_{1,S_0}, \ldots, x_{nx,S_0}, y_{0,S_0}, y_{1,S_0}, \ldots, y_{ny,S_0}) =$
$k(x_{0,B}, x_{1,B}, \ldots, x_{nx,B}, y_{0,B}, y_{1,B}, \ldots, y_{nx,B})$
and setting
$(x_{0,TS_0}, x_{1,TS_0}, x_{nx,TS_0}, \sqrt{\alpha}y_{0,TS_0}, y_{1,TS_0}, x_{ny,TS_0}) = (x_{0,k}, x_{1,k}, x_{nx,k}, \sqrt{\alpha}y_{0,k}, y_{1,k}, \ldots, y_{nx,k})$ n) computing a message point $(x_{0,m_0}, x_{1,m_0}, \ldots, x_{nx,m_0}, y_{0,m_0}, y_{1,m_0}, \ldots, x_{ny,m_0})$ as $(x_{0,m_0}, x_{1,m_0}, \ldots, x_{nx,m_0}, y_{1,m_0}, \ldots, y_{ny,m_0}) =$
$(x_{0,c_0}, x_{1,c_0}, \ldots, x_{nx,c_0}, y_{0,c_0}, y_{1,c_0}, \ldots, y_{ny,c_0})$
$- (x_{0,S_0}, x_{1,S_0}, \ldots, x_{nx,S_0}, y_{0,S_0}, y_{1,S_0}, \ldots, x_{ny,S_0})$
and setting
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha}y_{0,m_0}, y_{1,m_0}, \ldots, y_{ny,m_0})$ is computed as
$(x_{0,m_0}, x_{1,m_0}, \ldots, x_{nx,m_0}, \sqrt{\alpha}y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$
$- (x_{0,TS_0}, x_{1,TS_0}, \ldots, x_{nx,TS_0}, \sqrt{\alpha}y_{0,TS_0}, y_{1,TS_0}, \ldots, y_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, y_{ny,S_0})$;

o) recovering the secret message bit string of 0-th block from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha}y_{0,m_0}, y_{1,m_0}, \ldots, y_{ny,m_0})$ if the message point is on the twist of the elliptic polynomial, and using any additional information received from the sending correspondent;

p) setting i=0 and iteratively repeating the following steps q) through r) until i>u:

q) computing the message point $(x_{0,m_i}, x_{1,m_i}, \ldots, x_{nx,m_i}, y_{0,m_i}, y_{1,m_i}, \ldots, y_{ny,m_i})$ as
$(x_{0,m_i}, x_{1,m_i}, \ldots, x_{nx,m_i}, y_{0,m_i}, y_{1,m_i}, \ldots, y_{ny,m_i}) =$
$(x_{0,c_i}, x_{1,c_i}, \ldots, x_{nx,c_i}, y_{0,c_i}, y_{1,c_i}, \ldots, y_{ny,c_i})$
$- (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_i}, x_{1,Tc_i}, \ldots, x_{nx,Tc_i}, \sqrt{\alpha}y_{0,Tc_i}, y_{1,Tc_i}, \ldots, x_{ny,Tc_i})$
if the received cipher point of the i-th block $(x_{0,c_i}, x_{1,c_i}, \ldots, x_{nx,c_i}, y_{0,c_i}, y_{1,c_i}, \ldots, y_{ny,c_i}))$ is on the elliptic polynomial, wherein if the received cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha}y_{0,m_i}, y_{1,m_i}, \ldots, y_{ny,m_i})$ is computed as
$(x_{0,m_i}, x_{1,m_i}, \ldots, x_{nx,m_i}, \sqrt{\alpha}y_{0,m_i}, y_{1,m_i}, \ldots, y_{ny,m_i}) =$
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$
$- (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$
and
$(x_{0,c_{i-1}}, x_{1,c_{i-1}}, \ldots, x_{nx,c_{i-1}}, \sqrt{\alpha}y_{0,c_{i-1}}, y_{1,c_{i-1}}, \ldots, y_{ny,c_{i-1}}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;
and r) recovering the secret message bit string of i-th block from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha}y_{0,m_i}, y_{1,m_i}, \ldots, y_{ny,m_i})$ if the message point is on the twist of the elliptic polynomial, and using any additional information received from the sending correspondent.

These and other features of the present invention will become readily apparent upon further review of the following specification and drawings.

BRIEF DESCRIPTION OF THE DRAWINGS

The sole drawing FIGURE is a block diagram illustrating system components for implementing the method of performing cipher block chaining using elliptic polynomial cryptography according to the present invention.

These and other features of the present invention will become readily apparent upon further review of the following specification and drawings.

DETAILED DESCRIPTION OF THE PREFERRED EMBODIMENTS

The method of performing cipher block chaining using elliptic polynomial cryptography provides elliptic polynomial cryptographic methods based on the elliptic polynomial discrete logarithm problem. It is well known that an elliptic polynomial discrete logarithm problem is a computationally "difficult" or "hard" problem.

The block chaining methods to be described below use elliptic polynomials in their generation, where different elliptic polynomials are used for different blocks of the same plaintext. Particularly, the cryptographic methods use an elliptic polynomial with more than one independent x-coordinate. More specifically, a set of elliptic polynomial points are used which satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form is defined over additions in the extended dimensional space, and, as will be described in detail below, the method makes use of elliptic polynomials where different elliptic polynomials are used for different blocks of the same plaintext.

The particular advantage of using elliptic polynomial cryptography with more than one x-coordinate is that additional x-coordinates are used to embed extra message data bits in a single elliptic point that satisfies the elliptic polynomials equation. Given that nx additional x-coordinates are used, with nx being greater than or equal to one, a resulting elliptic point has (nx+1) x-coordinates, where all coordinates are elements of the finite field F. The number of points which satisfy an elliptic polynomials equation with nx additional x-coordinates defined over F and which can be used in the corresponding cryptosystem is increased by a factor of $(\#F)^{nx}$, where # denotes the size of a field.

Through the use of this particular method, security is increased through the usage of different elliptic polynomials for different message blocks during the encryption. Further, each elliptic polynomials used for each message block are selected at random, preferably using an initial value and a random number generator.

Given the form of the elliptic polynomial equation described above, the elliptic polynomial and its twist are isomorphic with respect to one another. The method uses an embedding technique, to be described in greater detail below, which allows the embedding of a bit string into the x-coordinates of an elliptic polynomial point in a deterministic and non-iterative manner when the elliptic polynomial has the above described form. This embedding method overcomes the disadvantage of the time overhead of the iterative embedding methods used in existing elliptic polynomial-based methods.

The difficulty of using conventional elliptic polynomial cryptography for message encryption typically lies in the iterative and non-deterministic method needed to embed a bit string into an elliptic polynomial point, which has the drawback of the number of iterations needed being different for different bit strings which are being embedded. As a consequence, different calculation times are required for different blocks of bit strings. Such a data-dependant generation time is not suitable for generalized encryption methods, which require data independent encryption times. Further, with regard to iterative and non-deterministic methods in conventional elliptic polynomial cryptography, given an elliptic polynomial defined over a finite field that needs N-bits for the representation of its elements, only ((nx+ny+1)N−L) bits of the message data bits can be embedded in any elliptic polynomial point.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point which is either on the elliptic polynomial or its twist. This bijective relationship allows for the development of the encryption to be described below.

In the conventional approach to elliptic polynomial cryptography, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

Further, projective coordinates are used at the sending and receiving entities in order to eliminate inversion or division during each point addition and doubling operation of the scalar multiplication. It should be noted that all of present methods disclosed herein are scalable.

In the following, with regard to elliptic polynomials, the "degree" of a variable $u^i$ is simply the exponent i. A polynomial is defined as the sum of several terms, which are herein referred to as "monomials", and the total degree of a monomial $u^i v^j w^k$ is given by (i+j+k). Further, in the following, the symbol $\in$ denotes set membership.

One form of the subject elliptic polynomial equation with more than one x-coordinate and one or more y-coordinates is defined as follows: the elliptic polynomial is a polynomial with more than two independent variables such that the maximum total degree of any monomial in the curve is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

Letting $S_{nx}$ represents the set of numbers from 0 to nx (i.e., $S_{nx}=\{0, \ldots, nx\}$), and letting $S_{ny}$ represents the set of numbers from 0 to ny (i.e., $S_{ny}=\{0, \ldots, ny\}$), and further setting $(nx+ny) \geq 1$, then, given a finite field, F, the following equation defined over F is one example of the polynomial described above:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k + \sum_{k,l \in S_{ny}, i \in S_{nx}} c_{1kli} y_k y_l x_i + \quad (1)$$
$$\sum_{k \in S_{ny}, l \in S_{nx}} c_{2kl} y_k x_l + \sum_{k \in S_{ny}, l, i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c,$$

where $a_{1k}, a_{2kl}, a_{3k}, c_{1lki}, c_{2kl}, c_{3kli}, b_{1l}, b_{2lk}, b_{3lk}, b_{4k},$ & $b_c \in F$ Two possible examples of equation (1) are $y_0^2 = x_0^3 + x_1^3 + x_0 x_1$ and $y_0^2 + x_0 x_1 y_0 + y_0 = x_0^3 + x_1^3 + x_0^2 x_1 + x_0 x_1^2 + x_0 x_1 + x_0 + x_1$.

With regard to the use of the elliptic polynomial equation in the addition of points of an elliptic polynomial with more than one x-coordinate and one or more y-coordinates, we may examine specific coefficients $a_{1k}, a_{2kl}, a_{3k}, c_{1lki}, c_{2kl}, c_{3kli}, b_{1l}, b_{2lk}, b_{3lk}, b_{4k}, \& b_c \in F$, wherein a set of points $EC^{nx+ny+2}$ is defined as the (nx+ny+2)-tuple $(x_0, x_1, \ldots, x_{nx}, y_0, y_1, \ldots, y_{ny})$, where $x_1, y_k \in F$, $i \in S_{nx}$ and $k \in S_{ny}$. This set of points are solutions of F, though excluding the point $(0, 0, \ldots, 0)$ and the point at infinity, $(x_{0,I}, x_{1,I}, \ldots, x_{nx,I}, y_{0,I}, y_{1,I}, \ldots, y_{ny,I})$.

The rules for conventional elliptic curve point addition may be adopted to define an additive binary operation, "+", over $EC^{nx+ny+2}$, i.e., for all
$(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$,
the sum:
$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$
is also
$(x_{0,3}, x_{1,3}, \ldots, x_{nx,3}, y_{0,3}, y_{1,3}, \ldots, y_{ny,3}) \in EC^{nx+ny+2}$.

As will be described in greater detail below, $(EC^{nx+ny+2}, +)$ forms a pseudo-group (p-group) over addition that satisfies the following axioms:

(i) There exists a set $(x_{0,I}, x_{1,I}, \ldots, x_{nx,I}, y_{0,I}, y_{1,I}, \ldots, y_{ny,I}) \in EC^{nx+ny+2}$ such that
$(x_0, x_1, \ldots, x_{nx}, y_0, y_1, \ldots, y_{ny}) + (x_{0,I}, x_{1,I}, \ldots, x_{nx,I}, y_{0,I}, y_{1,I}, \ldots, y_{ny,I}) =$
$(x_0, x_1, \ldots, x_{nx}, y_0, y_1, \ldots, y_{ny})$
for all $(x_0, x_1, \ldots, x_{nx}, y_0, y_1, \ldots, y_{ny}) \in EC^{nx+ny+2}$;

(ii) for every set $(x_0, x_1, \ldots, x_{nx}, y_0, y_1, \ldots, y_{ny}) \in EC^{nx+ny+2}$, there exists an inverse set, $-(x_0, x_1, \ldots, x_{nx}, y_0, y_1, \ldots, y_{ny}) \in EC^{nx+ny+2}$, such that
$(x_0, x_1, \ldots, x_{nx}, y_0, y_1, \ldots, y_{ny}) - (x_0, x_1, \ldots, x_{nx}, y_0, y_1, \ldots, y_{ny}) = (x_{0,I}, x_{1,I}, \ldots, x_{nx,I}, y_{0,I}, y_{1,I}, \ldots, y_{ny,I})$;

(iii) the additive binary operation in $(EC^{nx+ny+2}, +)$ is commutative, and the p-group $(EC^{nx+ny+2}, +)$ forms a group over addition when:

(iv) the additive binary operation in $(EC^{nx+ny+2}, +)$ is associative.

Prior to a more detailed analysis of the above axioms, the concept of point equivalence must be further developed. Mappings can be used to indicate that an elliptic point represented using (nx+1) x-coordinates and (ny+1) y-coordinates, $(x_0, x_1, \ldots, x_{nx}, y_0, y_1, \ldots, y_{ny})$, is equivalent to one or more elliptic points that satisfy the same elliptic polynomial equation, including the equivalence of an elliptic point to itself.

Points that are equivalent to one another can be substituted for each other at random, or according to certain rules during point addition and/or point doubling operations. For example, the addition of two points $(x_{0,1}, x_{1,1}, \ldots, x_{nx,1}, y_{0,1}, y_{1,1}, \ldots, y_{ny,1})$ and $(x_{0,2}, x_{1,2}, \ldots, x_{nx,2}, y_{0,2}, y_{1,2}, \ldots, y_{ny,2})$ is given by:
$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1})$
$+ (x_{0,2}, x_{1,2}, \ldots, x_{nx,2}, y_{0,2}, y_{1,2}, \ldots, y_{ny,2})$.

If the point $(x''_{0,1}, x''_{1,1}, \ldots, x''_{nx,1}, y''_{0,1}, y''_{1,1}, \ldots, y''_{ny,1})$ is equivalent to the point $(x_{0,1}, x_{1,1}, \ldots, x_{nx,1}, y_{0,1}, y_{1,1}, \ldots, y_{ny,1})$, then the former can be substituted for $(x_{0,1}, x_{1,1}, \ldots, x_{nx,1}, y_{0,1}, y_{1,1}, \ldots, y_{ny,1})$ in the above equation in order to obtain:
$(x_{0,3}, x_{1,3}, \ldots, x_{nx,3}, y_{0,3}, y_{1,3}, \ldots, y_{ny,3}) = (x''_{0,1}, x''_{1,1}, \ldots, x''_{nx,1}, y''_{0,1}, y''_{1,1}, \ldots, y''_{ny,1})$
$+ (x_{0,2}, x_{1,2}, \ldots, x_{nx,2}, y_{0,2}, y_{1,2}, \ldots, y_{ny,2})$.

Mappings that are used to define equivalences can be based on certain properties that exist in elliptic polynomial equations, such as symmetry between variables. As an example, we consider the point $(x_0, x_1, y_0)$ that satisfies the equation $y_0^2 = x_0^3 + x_1^3 + x_0 x_1$. The equivalent of this point may be defined as $(x_1, x_0, -y_0)$.

With regard to the addition rules for $(EC^{nx+ny+2}, +)$, the addition operation of two points $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, otherwise expressed as:
$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1})$
$+ (x_{0,2}, x_{1,2}, \ldots, x_{nx,2}, y_{0,2}, y_{1,2}, \ldots, y_{ny,2})$
is calculated in the following manner. First, a straight line is drawn which passes through the two points to be added. The straight line intersects $EC^{nx+ny+2}$ at a third point, which we denote $(x'_{0,3}, x'_{1,3}, \ldots, x'_{nx,3}, y'_{0,3}, y'_{1,3}, \ldots, y'_{ny,3}) \in EC^{nx+ny+2}$. The sum point is defined as $(x_{0,3}, x_{1,3}, \ldots, x_{nx,3}, y_{0,3}, y_{1,3}, \ldots, y_{ny,3}) = -(x'_{0,3}, x'_{1,3}, \ldots, x'_{nx,3}, y'_{0,3}, y'_{1,3}, \ldots, y'_{ny,3})$.

From the above definition of the addition rule, addition over $EC^{nx+ny+2}$ is commutative, that is:
$(x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) =$
$(x_{0,2}, x_{1,2}, \ldots, x_{nx,2}, y_{0,2}, y_{1,2}, \ldots, y_{ny,2}) + (x_{0,1}, x_{1,1}, \ldots, x_{nx,1}, y_{0,1}, y_{1,1}, \ldots, y_{ny,1})$
for all $(x_{0,1}, x_{1,1}, \ldots, x_{nx,1}, y_{0,1}, y_{1,1}, \ldots, y_{ny,1}) \in EC^{nx+ny+2}$ and for all $(x_{0,2}, x_{1,2}, \ldots, x_{nx,2}, y_{0,2}, y_{1,2}, \ldots, y_{ny,2}) \in EC^{nx+ny+2}$. This commutivity satisfies axiom (iii) above.

There are two primary cases that need to be considered for the computation of point addition for $(EC^{nx+ny+2}, +)$: (A) for at least one $j \in S_{nx}$, $x_{j,1} \neq x_{j,2}$, and (B) for all $j \in S_{nx}$, $x_{j,1} = x_{j,2} = x_{j,o}$. Case B includes three sub-cases:

i. for all $k \in S_{ny} y_{k,1} = y_{k,2}$ that is:
$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$,
which corresponds to point doubling;

ii. for $k \in S_{ny}$ & $k \neq 0$, $y_{k,1} = y_{k,2}$ and where $y_{0,1}$ & $y_{0,2}$ are the roots of the following quadratic equation in $y_0$:

$$a_{10} y_0^2 + \sum_{k \in S_{ny}, k \neq 0} a_{1k} y_{k,1}^2 + y_0 \left\{ \sum_{k \in S_{ny}, k \neq 0} a_{2k0} y_{k,1} + \sum_{l \in S_{ny}, l \neq 0} a_{20l} y_{l,1} \right\} +$$
$$\sum_{k,l \in S_{ny}, l \neq k, l \& k \neq 0} a_{2kl} y_{k,1} y_{l,1} + a_{30} y_0 + \sum_{k \in S_{ny}, k \neq 0} a_{3k} y_{k,1} +$$
$$y_0^2 \sum_{i \in S_{nx}} c_{100i} x_{i,1} + y_0 \left\{ \sum_{k \in S_{ny}, i \in S_{nx}} c_{1k0i} y_{k,1} x_{i,1} + \sum_{l \in S_{ny}, i \in S_{nx}} c_{10li} y_{l,1} x_{i,1} \right\} +$$
$$\sum_{k,l \in S_{ny}, l \& k \neq 0, i \in S_{nx}} c_{1kli} y_{k,1} y_{l,1} x_{i,1} +$$
$$y_0 \sum_{l \in S_{nx}} c_{20l} x_{l,1} + \sum_{k \in S_{ny}, k \neq 0, l \in S_{nx}} c_{2kl} y_{k,1} x_{l,1} +$$
$$y_0 \sum_{l,i \in S_{nx}} c_{30li} x_{l,1} x_{i,1} + \sum_{k \in S_{ny}, k \neq 0, l,i \in S_{nx}} c_{3kli} y_{k,1} x_{l,1} x_{i,1} =$$
$$\sum_{l \in S_{nx}} b_{1l} x_{l,1}^3 + \sum_{l,k \in S_{nx}, l \neq k} b_{2lk} x_{l,1}^2 x_{k,1} + \sum_{l,k \in S_{nx}} b_{3lk} x_{l,1} x_{k,1} + \sum_{k \in S_{nx}} b_{4k} x_{k,1} + b_c,$$

which corresponds to point inverse; and iii. all other conditions except those in Cases B.i and B.ii. This case occurs only when ny is greater than or equal to one.

For Case A, for at least one $j \in S_{nx} x_{j,1} \neq x_{j,2}$, a straight line in (nx+ny+2)-dimensional space is defined by $$\frac{y_k - y_{k,1}}{y_{k,2} - y_{k,1}} = \frac{x_j - x_{j,1}}{x_{j,2} - x_{j,1}},$$

$k \in S_{ny}$ and $j \in S_{nx}$ and $$\frac{x_i - x_{i,1}}{x_{i,2} - x_{i,1}} = \frac{x_j - x_{j,1}}{x_{j,2} - x_{j,1}},$$

$i \neq j$, $i \in S_{nx}$.

For this case, $y_k = m_{yk} x_j + c_{yk}$, where $$m_{yk} = \frac{y_{k,2} - y_{k,1}}{x_{j,2} - x_{j,1}}$$

and $c_{yk} = y_{k,1} - x_{j,1} m_{yk}$. Further, $x_i = m_{xi} x_j + c_{xi}$, where $$m_{xi} = \frac{x_{i,2} - x_{i,1}}{x_{j,2} - x_{j,1}}$$

and $c_{xi} = x_{i,1} - x_{j,1} m_{xi}$. Equation (1) can then be re-written as:

$$\sum_{k \in S_{ny}} a_{1k} y_k^2 + \sum_{k, l \in S_{ny}, l \neq k} a_{2kl} y_k y_l + \sum_{k \in S_{ny}} a_{3k} y_k +$$
$$x_j \sum_{k, l \in S_{ny}} c_{1klj} y_k y_l + \sum_{k, l \in S_{ny}, i \in S_{nx}, i \neq j} c_{1kli} y_k y_l x_i + x_j \sum_{k \in S_{ny}} c_{2kj} y_k +$$
$$\sum_{k \in S_{ny}, i \in S_{nx}, i \neq j} c_{2kl} y_k x_l + x_j^2 \sum_{k \in S_{ny}} c_{3kjj} y_k + x_j \sum_{k \in S_{ny}, l \in S_{nx}, l \neq j} c_{3klj} y_k x_l +$$
$$x_j \sum_{k \in S_{ny}, i \in S_{nx}, i \neq j} c_{3kji} y_k x_i + \sum_{k \in S_{ny}, l, i \in S_{nx}, l \& i \neq j} c_{3kli} y_k x_l x_i =$$
$$b_{1j} x_j^3 + \sum_{l \in S_{nx}, l \neq j} b_{1l} x_l^3 + x_j^2 \sum_{k \in S_{nx}, k \neq j} b_{2jk} x_k + x_j \sum_{l \in S_{nx}, l \neq j} b_{2lj} x_l^2 +$$
$$\sum_{l, k \in S_{nx}, l, k \neq j, l \neq k} b_{2lk} x_l^2 x_k + b_{3jj} x_j^2 + x_j \sum_{k \in S_{nx}, k \neq j} b_{3jk} x_k +$$
$$x_j \sum_{l \in S_{nx}, l \neq j} b_{3lj} x_l + \sum_{l, k \in S_{nx}, l, k \neq j} b_{3lk} x_l x_k + b_{4j} x_j + \sum_{k \in S_{nx}, k \neq j} b_{4k} x_k + b_c,$$

and substitution of the above into the rewritten equation (1) for $y_k$, $k \in S_{ny}$ and $x_i$, $i \in S_{nx}$ & $i \neq j$, results in:

$$\sum_{k \in S_{ny}} a_{1k} (m_{yk} x_j + c_{yk})^2 + \sum_{k, l \in S_{ny}, l \neq k} a_{2kl} (m_{yk} x_j + c_{yk})(m_{yl} x_j + c_{yl}) +$$
$$\sum_{k \in S_{ny}} a_{3k} (m_{yk} x_j + c_{yk}) + x_j \sum_{k, l \in S_{ny}} c_{1klj} (m_{yk} x_j + c_{yk})(m_{yl} x_j + c_{yl}) +$$
$$\sum_{k, l \in S_{ny}, i \in S_{nx}, i \neq j} c_{1kli} (m_{yk} x_j + c_{yk})(m_{yl} x_j + c_{yl})(m_{xi} x_j + c_{xi}) +$$
$$x_j \sum_{k \in S_{ny}} c_{2kj} (m_{yk} x_j + c_{yk}) + \sum_{k \in S_{ny}, l \in S_{nx}, l \neq j} c_{2kl} (m_{yk} x_j + c_{yk})(m_{xl} x_j + c_{xl}) +$$
$$x_j^2 \sum_{k \in S_{ny}} c_{3kjj} (m_{yk} x_j + c_{yk}) +$$

-continued $$x_j \sum_{k \in S_{ny}, l \in S_{nx}, l \neq j} c_{3klj} (m_{yk} x_j + c_{yk})(m_{xl} x_j + c_{xl}) +$$
$$x_j \sum_{k \in S_{ny}, i \in S_{nx}, i \neq j} c_{3kji} (m_{yk} x_j + c_{yk})(m_{xi} x_j + c_{xi}) +$$
$$\sum_{k \in S_{ny}, l, i \in S_{nx}, l \& i \neq j} c_{3kli} (m_{yk} x_j + c_{yk})(m_{xl} x_j + c_{xl})(m_{xi} x_j + c_{xi}) =$$
$$b_{1j} x_j^3 + \sum_{l \in S_{nx}, l \neq j} b_{1l} (m_{xl} x_j + c_l)^3 + x_j^2 \sum_{k \in S_{nx}, k \neq j} b_{2jk} (m_{xk} x_j + c_{xk}) +$$
$$x_j \sum_{l \in S_{nx}, l \neq j} b_{2lj} (m_{xl} x_j + c_{xl})^2 +$$
$$\sum_{l, k \in S_{nx}, l \& k \neq j, l \neq k} b_{2lk} (m_{xl} x_j + c_{xl})^2 (m_{xk} x_j + c_{xk}) + b_{3jj} x_j^2 +$$
$$x_j \sum_{k \in S_{nx}, k \neq j} b_{3jk} (m_{xk} x_j + c_{xk}) + x_j \sum_{l \in S_{nx}, l \neq j} b_{3lj} (m_{xl} x_j + c_{xl}) +$$
$$\sum_{l, k \in S_{nx}, l \& k \neq j} b_{3lk} (m_{xl} x_j + c_{xl})(m_{xk} x_j + c_{xk}) +$$
$$b_{4j} x_j + \sum_{k \in S_{nx}, k \neq j} a_{6k} (m_{xk} x_j + c_{xk}) + b_c$$

Expanding the terms in the above equation leads to a cubic equation in $x_j$, $C_3 x_j^3 + C_2 x_j^2 + C_1 x_j + C_0 = 0$, where $C_3, C_2, C_1$ & $C_0$ are obtained from the above equation.

Assuming $C_3 \neq 0$, the above cubic equation in $x_1$ has three roots $x_{j,1}$, $x_{j,2}$, & $x'_{j,3}$ and can written as $(x_j - x_{j,1})(x_j - x_{j,2})(x_j - x'_{j,3}) = 0$. Normalizing by the coefficient of $x^3$ and equating the coefficients of $x^2$ in the resulting equation with that in $(x_j - x_{j,1})(x_j - x_{j,2})(x_j - x'_{j,3}) = 0$, one obtains a solution for $$x'_{j,3} = \frac{-C_2}{C_3} - x_{j,1} - x_{j,2}. \tag{2}$$

The values of $y'_{k,3}$, $k \in S_{ny}$, and $x'_{i,3}$, $i \in S_{nx}$ & $i \neq j$, may be similarly obtained from equations for $x_j = x'_{j,3}$.

For cases where $C_3 = 0$, $C_3 x_j^3 + C_2 x_j^2 C_1 x_j + C_0 = 0$ becomes a quadratic equation. Such quadratic equations may be used in the definition of point equivalences.

With regard to Case B for all $j \in S_{nx}$, $x_{j,1} = x_{j,2}$, the three sub-cases are considered below. In all cases, $x_{j,o}$ is defined as $x_{j,o} = x_{j,1} = x_{j,2}$ $j \in S_{nx}$.

For Case B.i., all $k \in S_{ny}$, $y_{k,1} = y_{k,2}$, which corresponds to point doubling. In this case, $(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$. Letting:

$$(x_{0,o}, x_{1,o}, \ldots, x_{nx,o}, y_{0,o}, y_{1,o}, \ldots, y_{ny,o}) = (x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$$

the sum is written as $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,o}, x_{1,o}, \ldots, x_{nx,o}, y_{0,o}, y_{1,o}, \ldots, y_{ny,o}) \tag{3}$$

There are several ways of defining the addition in this case. Three possible rules are described below. Case B.i.1: Letting $S_{nx,Lx}$ denote a subset of $S_{nx}$ with Lx elements, i.e., $S_{nx,Lx} \subseteq S_{nx}$; letting $S_{ny,Ly}$ denote a subset of $S_{ny}$ with Ly elements and which does not include the element 0; i.e. $S_{ny,Ly} \subseteq S_{ny}$ and $0 \notin S_{ny,Ly}$; setting the value of Lx and Ly as at least one, then the straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensional space with coordinates $y_n$ and $x_m$ with $n \in S_{ny,Ly}$ and $m \in S_{nx,Lx}$.

In this case, the gradients $m_{yn}$ and $m_{xm}$ of the straight line to be used in equation (2) are essentially the first derivatives of $y_n$ and $x_m$, $n \in S_{nx,Ly}$ and $M \in S_{nx,Lx}$ for F with respect to $x_j \in S_{nx,Lx}$, i.e., $$m_{yn} = \frac{dy_n}{dx_j} \text{ and } m_{xn} = \frac{dy_m}{dx_j}.$$

Using these derivatives for the values of the gradients, $$m_{yn} = \frac{dy_n}{dx_j},$$

where $n \in S_{ny,Ly}$, and $$m_{xn} = \frac{dx_m}{dx_j},$$

where $m \in S_{nx,Lx}$, in equation (2) and noting that it is assumed that $$\frac{dx_m}{dx_j} = 0,$$

for $m \in (S_{nx} - S_{nx,Lx})$ and $$\frac{dy_n}{dx_j} = 0,$$

for $n \in (S_{ny} - S_{ny,Lx})$, then a solution for $x'_{j,3}$ may be obtained.

The values of $y'_{n,3}$ for $n \in S_{ny}$ and $x'_{m,3}$ for $m \in S_{nx}$ & $m \neq j$, can further be obtained for $x_j = x'_{j,3}$. The choice of the $x_m$-coordinates, $m \in S_{nx,Lx}$, and $y_n$-coordinates, $n \in S_{ny,Ly}$, which can be used to compute the tangent of the straight line in this case may be chosen at random or according to a pre-defined rule. Further, a different choice of the $x_m$-coordinates, $m \in S_{nx,Lx}$, and $y_n$-coordinates, $n \in S_{ny,Ly}$, may be made when one needs to compute successive point doublings, such as that needed in scalar multiplication.

With regard to the next case, Case B.i.2, the second possible way of defining the addition of a point with itself is to apply a sequence of the point doublings according to the rule defined above in Case B.i.1, where the rule is applied with a different selection of the x-coordinate(s) and y-coordinates(s) in each step of this sequence.

In the third sub-case, Case B.i.3, a point is substituted with one of its equivalents. Letting $(x_{0,oe}, x_{1,oe}, \ldots, x_{nx,oe}, y_{0,oe}, y_{1,oe}, \ldots, y_{ny,oe})$ represent the equivalent point of $(x_{0,o}, x_{1,o}, \ldots, x_{nx,o}, y_{0,o}, y_{1,o}, \ldots, y_{ny,o})$, then equation (3) may be written as:

$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o})$ $(x_{0,oe}, x_{1,oe}, \ldots, x_{nx,oe}, y_{0,oe}, y_{1,oe}, \ldots, y_{ny,oe})$ With regard to Case B.ii, for $k \in S_{ny}$ & $k \neq 0$, $y_{k,1} = y_{k,2}$, and where $Y_{0,1}$ & $y_{0,2}$ are the roots of the quadratic equation in $y_0$, this case corresponds to generation of the point inverse.

Letting $y_{k,1} = y_{k,2} = y_{k,o}$ for $k \in S_{ny}$ & $k \neq 0$, then any two points, such as the point $(x_{0,o}, x_{1,o}, \ldots, x_{nx,o}, y_{0,o}, y_{1,o}, \ldots, y_{ny,o}) \in EC^{nx+ny+2}$ and the point $(x_{0,o}, x_{1,o}, \ldots, x_{nx,o}, y_{0,o}, y_{1,o}, \ldots, y_{ny,o}) \in EC^{nx+ny+2}$, are in the hyper-plane with $x_1 = x_{i,o}$, $i \in S_{nx}$ and $y_k = y_{k,o}$, $k \in S_{ny}$ & $k \neq 0$. Thus, any straight line joining these two points such that $(x_{0,o}, x_{1,o}, \ldots, x_{nx,o}, y_{0,o}, y_{1,o}, \ldots, y_{ny,o}) \neq (x_{0,o}, x_{1,o}, \ldots, x_{nx,o}, y_{0,2}, y_{1,o}, \ldots, y_{ny,o})$ is also in this hyper-plane.

Substituting the values of $(x_{0,o}, x_{1,o}, \ldots, x_{nx,o}, y_{0,o}, y_{1,o}, \ldots, \& y_{ny,o})$ in an elliptic polynomial equation with multiple x-coordinates and multiple y-coordinates, a quadratic equation for $y_0$ is obtained, as given above. Thus, $y_0$ has only two solutions, $y_{0,1}$ & $y_{0,2}$.

Thus, a line joining points $(x_{0,o}, x_{1,o}, \ldots, x_{nx,o}, y_{0,o}, y_{1,o}, \ldots, y_{ny,o}) \in EC^{nx+ny+2}$ and $(x_{0,o}, x_{1,o}, \ldots, x_{nx,o}, y_{0,o}, y_{1,o}, \ldots, y_{ny,o}) \in EC^{nx+ny+2}$ does not intersect with $EC^{nx+ny+2}$ at a third point.

A line that joins these two points is assumed to intersect with $EC^{nx+ny+2}$ at infinity $(x_{0,I}, x_{1,I}, \ldots, x_{nx,I}, y_{0,I}, y_{1,I}, \ldots, y_{ny,I}) \in EC^{nx+ny+2}$. This point at infinity is used to define both the inverse of a point in $EC^{nx+ny+2}$ and the identity point. According to the addition rule defined above, one can write:

$$(x_0, x_1, \ldots, x_{nx}, y_{0,1}, y_1, \ldots, y_{ny}) + (x_0, x_1, \ldots, x_{nx}, y_{0,2}, y_1, \ldots, y_{ny}) = (x_{0,I}, x_{1,I}, \ldots, x_{nx,I}, y_{0,I}, y_{1,I}, \ldots, y_{ny,I}) \quad (4),$$

since the third point of intersection of such lines is assumed to be at infinity, $(x_{0,I}, x_{1,I}, \ldots, x_{nx,I}, y_{0,I}, y_{1,I}, \ldots, y_{ny,I} \in qj)$ $EC^{nx+ny+2}$. Thus, this equation defines a unique inverse for any point $(x_0, x_1, \ldots, x_{nx}, y_0, y_1, \ldots, y_{ny}) \in EC^{nx+ny+2}$, namely:

$-(x_0, x_1, \ldots, x_{nx}, y_0, y_1, \ldots, y_{ny}) = (x_0, x_1, \ldots, x_{nx}, y_{0,2}, y_1, \ldots, y_{ny})$.

Thus, equation (4) can be written as:

$$(x_0, x_1, \ldots, x_{nx}, y_{0,1}, y_1, \ldots, y_{ny}) - (x_0, x_1, \ldots, x_{nx}, y_{0,0}, y_1, \ldots, y_{ny}) = (x_{0,I}, x_{1,I}, \ldots, x_{nx,I}, y_{0,I}, y_{1,I}, \ldots, y_{ny,I}) \quad (5).$$

Further, a line joining the point at infinity $(x_{0,I}, x_{1,I}, \ldots, x_{nx,I}, y_{0,I}, y_{1,I}, \ldots, y_{ny,I}) \in EC^{nx+ny+2}$ and a point $(x_0, x_1, \ldots, x_{nx}, y_{0,1}, y_1, \ldots, y_{ny}) \in EC^{nx+ny+2}$ will intersect with $EC^{nx+ny+2}$ at $(x_0, x_1, \ldots, x_{nx}, y_{0,2}, y_1, \ldots, y_{ny}) \in EC^{nx+ny+2}$. Thus, from the addition rule defined above, $$(x_0, x_1, \ldots, x_{nx}, y_0, y_1, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_0, y_1, \ldots, y_{ny}) \quad (6).$$

Equation (5) satisfies axiom (ii) while equation (6) satisfies axiom (i), defined above.

Case B.iii applies for all other conditions except those in cases B.i and B.ii. This case occurs only when ny is greater than or equal to one. Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ that do not satisfy the conditions of cases B.i and B.ii above, the sum point is written as $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1})$
$+ (x_{0,o}, x_{1,o}, \ldots, x_{nx,o}, y_{0,2}, y_{1,2}, \ldots, y_{ny,2})$.

There are several possible rules to find the sum point in this case. Three possible methods are given below.

1) Using three point doublings and one point addition, $(x_{0,3}, x_{1,3}, \ldots, x_{nx,3}, y_{0,3}, y_{1,3}, \ldots, y_{ny,3}) = 4(x_{0,o}, x_{1,o}, \ldots, x_{nx,o}, y_{0,1}, y_{1,1}, \ldots, y_{ny,1})$
$-2(x_{0,o}, x_{1,o}, \ldots, x_{nx,o}, y_{0,2}, y_{1,2}, \ldots, y_{ny,2})$;

2) using one point doublings and three point additions, $(x_{0,3}, x_{1,3}, \ldots, x_{nx,3}, y_{0,3}, y_{1,3}, \ldots, y_{ny,3}) = (2(x_{0,o}, x_{1,o}, \ldots, x_{nx,o}, y_{0,1}, y_{1,1}, \ldots, y_{ny,1})$
$+ (x_{0,o}, x_{1,o}, \ldots, x_{nx,o}, y_{0,2}, y_{1,2}, \ldots, y_{ny,2})) - (x_{0,o}, x_{1,o}, \ldots, x_{nx,o}, y_{0,1}, y_{1,1}, \ldots, y_{ny,1})$; and 3) using point equivalence, $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1})$ $+(x_{0,oe}, x_{1,oe}, \ldots, x_{nx,oe}, y_{0,2e}, y_{1,2e}, \ldots, y_{ny,2e})$,
where $(x_{0,oe}, x_{1,oe}, \ldots, x_{nx,oe}, y_{0,2e}, y_{1,2e}, \ldots, y_{ny,2e})$ is assumed to be the equivalent point of $(x_{0,o}, x_{1,o}, \ldots, x_{nx,o}, y_{0,2}, y_{1,2}, \ldots, y_{ny,2})$.

It should be noted that the above methods for defining the sum point are not the only ones that can be defined and are provided for exemplary purposes only. The choice of method used to obtain the sum point in this case should depend on the computation complexity of point addition and point doubling.

With regard to associativity, one way of proving associativity of $(EC^{nx+ny+2}, +)$ is as follows: Given particular elliptic polynomial equations (i.e., for particular coefficients $a_{1k}$, $a_{2kl}$, $a_{3k}$, $c_{1lki}$, $c_{2kl}$, $c_{3kli}$, $b_{1l}$, $b_{2lk}$, $b_{3lk}$, $b_{4k}$, $b_c \in F$) defined over a finite field F, if it can be shown by computation that any point $Q \in EC^{nx+ny+2}$ (and any of its equivalent points) can be uniquely written as $k_Q P \in EC^{nx+ny+2}$, where P is the generator point of $(EC^{nx+ny+2}, +)$, then the corresponding $EC^{nx+ny+2}$ groups based on such polynomials are associative. This is because any three points Q, R, S $\in EC^{nx+ny+2}$ (or any of their equivalent points) can be written as $k_Q P$, $k_R P$, $k_S P \in EC^{nx+ny+2}$ respectively, thus their sum $(Q+R+S)$. $(k_Q P + k_R P + k_S P) = (k_Q + k_R + k_S) P$ can be carried out in any order.

The following elliptic polynomial equation with nx=1 and ny=0 is used to show an example of the equations in Case A used in point addition: $y_0^2 = x_0^3 + x_1^3 + x_0 x_1$. Choosing $x_j = x_0$, and substituting $y_k = m_{yk} x_j + c_{yk}$ from Case A above for $y_0$, and the corresponding equation $x_1 = m_{x1} x_j + c_{x1}$ for $x_1$, one obtains $(m_{y0} x_0 + c_{y0})^2 = x_0^3 + (m_{x1} x_0 + c_{x1})^3 x_0 (m_{x1} x_0 + c_{x1})$.

Expanding this equation yields the equation $m_{y0}^2 x_0^2 + 2 m_{y0} c_{y0} x_0 + c_{y0}^2 = x_0^3 + m_{x1}^3 x_0^3 + 3 m_{x1}^2 c_{x1} x_0^2 + 3 m_{x1} c_{x1}^2 x_0 + c_{x1}^3 + c_{x1} x_0^2 + c_{x1} x_0$, or $(1 + m_{x1}^3) x_0^3 + (3 m_{x1}^2 c_{x1} + m_{x1} - m_{y0}^2) x_0^2 + (3 m_{x1} c_{x1}^2 + c_{x1} - 2 m_{y0} c_{y0}) x_0 + c_{x1}^3 - c_{y0}^2 = 0$. From equation (2), the solution for $x'_{0,3}$ in this case is obtained:

$$x'_{0,3} = \frac{-(3 m_{x1}^2 c_{x1} + m_{x1} - m_{y0}^2)}{(1 + m_{x1}^3)} - x_{j,1} - x_{j,2}.$$

Similarly, one can obtain the values of $y'_{0,3}$ and $x'_{1,3}$ for $x_0 = x'_{0,3}$.

It should be noted that when $m_{x1} = -1$, the coefficient of the cubic term in the above is zero; i.e. $C_3 = 0$. In this case, the resulting quadratic equation can be used in the definition of point equivalences for the points that satisfy the elliptic polynomial equation.

Each of the equations for point addition and point doublings derived for cases A and B above require modular inversion or division. In cases where field inversions or divisions are significantly more expensive (in terms of computational time and energy) than multiplication, projective coordinates are used to remove the requirement for field inversion or division from these equations.

Several projective coordinates can be utilized. In the preferred embodiment, the Jacobean projective coordinate system is used. As an example, we examine:

$$x_i = \frac{X_i}{V^2} \text{ for } i \in S_{nx}; \text{ and;} \tag{7}$$

and $$y_k = \frac{Y_k}{V^3} \text{ for } k \in S_{ny}. \tag{8}$$

Using Jacobian projection yields:

$$\sum_{k \in S_{ny}} a_{1k} \frac{Y_k^2}{V^6} + \sum_{k,l \in S_{ny}, l \neq k} a_{2kl} \frac{Y_k}{V^3} \frac{Y_l}{V^3} + \sum_{k \in S_{ny}} a_{3k} \frac{Y_k}{V^3} + \tag{9}$$

$$\sum_{k,l \in S_{ny}, i \in S_{nx}} c_{1kli} \frac{Y_k}{V^3} \frac{Y_l}{V^3} \frac{Y_i}{V^2} + \sum_{k \in S_{ny}, l \in S_{nx}} c_{2kl} \frac{Y_k}{V^3} \frac{Y_l}{V^2} +$$

$$\sum_{k \in S_{ny}, l, i \in S_{nx}} c_{3kli} \frac{Y_k}{V^3} \frac{Y_l}{V^2} \frac{Y_i}{V^2} = \sum_{l \in S_{nx}} b_{1l} \frac{X_l^3}{V^6} +$$

$$\sum_{l,k \in S_{nx}, l \neq k} b_{2lk} \frac{X_l^2}{V^4} \frac{X_k}{V^2} + \sum_{l,k \in S_{nx}} b_{3lk} \frac{X_l}{V^2} \frac{X_k}{V^2} + \sum_{k \in S_{nx}} b_{4k} \frac{X_k}{V^2} + b_c$$

which can be rewritten as:

$$\sum_{k \in S_{ny}} a_{1k} Y_k^2 V^2 + \sum_{k,l \in S_{ny}, l \neq k} a_{2kl} Y_k Y_l V^2 + \sum_{k \in S_{ny}} a_{3k} Y_k V^5 + \tag{10}$$

$$\sum_{k,l \in S_{ny}, i \in S_{nx}} c_{1kli} Y_k Y_l X_i + \sum_{k \in S_{ny}, l \in S_{nx}} c_{2kl} Y_k X_l V^3 +$$

$$\sum_{k \in S_{ny}, l, i \in S_{nx}} c_{3kli} Y_k X_l X_i V = \sum_{l \in S_{nx}} b_{1l} X_l^3 V^2 + \sum_{l,k \in S_{nx}, l \neq k} b_{2lk} X_l^2 X_k V^2 +$$

$$\sum_{l,k \in S_{nx}} b_{3lk} X_l X_k V^4 + \sum_{k \in S_{nx}} b_{4k} X_k V^6 + b_c V^8.$$

In the following, the points $(X_0, X_1, \ldots, X_{nx}, Y_0, Y_1, \ldots, Y_{ny}, V)$ are assumed to satisfy equation (10). When $V \neq 0$, the projected point $(X_0, X_1, \ldots, X_{nx}, Y_0, Y_1, \ldots, Y_{ny}, V)$ corresponds to the point:

$$(x_0, x_1, \ldots, x_{nx}, y_0, y_1, \ldots, y_{ny}) =$$

$$\left( \frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3} \right),$$

which satisfies equation (1).

Using Jacobean projective coordinates, equation (10) can be written as:

$$\left( \frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3} \right) = \tag{11}$$

$$\left( \frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3} \right) +$$

$$\left( \frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3} \right).$$

By using Jacobian projective coordinates in the equations of Cases A and B above, and by an appropriate choice of the value of $V_3$, it can be shown that point doubling and point addition can be computed without the need for field inversion or division.

As described above, conventional bit string embedding into an elliptic curve point involves an iterative algorithm to search for an x-coordinate value which will lead to a quadratic residue value of the y-coordinate starting from an initial x-coordinate value specified by the bit string to be embedded. However, such a process requires that the number of iterations needed is different for different bit strings that are being embedded. In the present method, an embedding methodology is utilized that embeds a bit string into an appropriate elliptic polynomial point with (nx+1) x-coordinates and (ny+1) y-coordinates in a deterministic and non-iterative manner. Further, the elliptic polynomial equation is of a specified form, i.e., it is isomorphic to its twist. This method circumvents the need for an iterative algorithm that involves the usual search for a quadratic residue value of the y-coordinate (which typically requires several iterations) and, further, suffers from the drawback that the number of iterations needed is different for different bit strings that are being embedded.

In order to examine the embedding method, the twist of an elliptic polynomial equation needs to be defined. Given an elliptic polynomial with (nx+1) x-coordinates and (ny+1) y-coordinates of the form described above:

$$y_0^2 + \sum_{k \in S_{ny}} a_{1k} y_k^2 + \sum_{k,l \in S_{ny}, l \neq k} a_{2kl} y_k y_l = \sum_{l \in S_{nx}} b_{1l} x_l^3 + \sum_{l,k \in S_{nx}, l \neq k} b_{2lk} x_l^2 x_k, \quad (12)$$

where $a_{3l}, \alpha_{2kl}, b_{1l}, b_{2lk} \in F$.

Given certain values for the x-coordinates $x_{0,o}, x_{1,o}, \ldots, x_{nx,o}$ and y-coordinates $y_{1,o}, \ldots, y_{ny,o}$, respectively, that are elements of the finite field, F, these values are substituted into the elliptic polynomial equation (1) in order to obtain a quadratic equation in $y_0$:

$$y_0^2 = -\sum_{k \in S_{ny}} a_{1k} y_{k,o}^2 - \sum_{k,l \in S_{ny}, l \neq k} a_{2kl} y_{k,o} y_{l,o} + \sum_{l \in S_{nx}} b_{1l} x_{l,o}^3 + \sum_{l,k \in S_{nx}, l \neq k} b_{2lk} x_{l,o}^2 x_{k,o} = T.$$

If a solution of the above quadratic equation (i.e., $y_0^2 = T$) is an element of the finite field F, the point $(x_{0,o}, x_{1,o}, \ldots, x_{nx,o}, y_{0,o}, y_{1,o}, \ldots, y_{ny,o})$ is said to satisfy the given elliptic polynomial equation. If a solution of the above quadratic equation is not an element of the finite field F, the point $(x_{0,o}, x_{1,o}, \ldots, x_{nx,o}, y_{0,o}, y_{1,o}, \ldots, y_{ny,o})$ is said to satisfy the twist of the given elliptic curve equation. The inventive embedding method is based on the isomorphic relationship between a curve and its twist as described in the following theorem:

An elliptic polynomial equation of the form given above is isomorphic to its twist if:
1) there are mathematical mappings that can be defined on the values of $x_0, x_1, \ldots, x_{nx}, y_1, \ldots, y_{ny}$ (i.e., $\phi_x(x_1)$ and $\phi_y(y_i)$) such that any point $(x_0, x_1, \ldots, x_{nx}, y_0, y_1, \ldots, y_{ny})$ that satisfies such an elliptic polynomial equation can be mapped into another point $(\phi_x(x_0), \phi_x(x_1), \ldots, \phi_x(x_{xn}), \phi_y(y_0), \phi_y(y_1), \ldots, \phi_y(y_{ny}))$ that satisfies the twist of the same elliptic polynomial equation; and
2) the mapping between the points $(x_0, x_1, \ldots, x_{nx}, y_0, y_1, \ldots, y_n)$ and $(\phi_x(x_0), \phi_x(x_1), \ldots, \phi_x(x_{xn}), \phi_y(y_0), \phi_y(Y_1), \ldots, \phi_y(y_{ny}))$ is unique, i.e., a one-to-one correspondence.

The proof of this theorem is as follows. Re-writing equation (12) as:

$$y_0^2 = \qquad (13)$$
$$-\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k,$$

and letting the right-hand side of equation (13) be denoted as T, then:

$$T = -\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k. \quad (14)$$

Thus, any value of $x_0, x_1, \ldots, x_{nx}, y_1, \ldots, y_{ny}$ will lead to a value of $T \in F(p)$. T could be quadratic residue or non-quadratic residue. If T is quadratic residue, then equation (14) is written as:

$$T_q = -\sum_{k \in S_{ny}} a_{1k} y_{k,q}^2 - \sum_{k,l \in S_{ny}, l \neq k} a_{2kl} y_{k,q} y_{l,q} + \qquad (15)$$
$$\sum_{l \in S_{nx}} b_{1l} x_{l,q}^3 + \sum_{l,k \in S_{nx}, l \neq k} b_{2lk} x_{l,q}^2 x_{k,q}$$

where $x_{0,q}, x_{1,q}, \ldots, x_{nx,q}, y_{0,q}, y_{1,q}, \ldots, y_{ny,q} \in F$ denotes the values of $x_0, x_1, \ldots, x_{nx}, y_0, y_1, \ldots, y_{ny}$ that result in a quadratic residue value of T, which is hereafter denoted as $T_q$.

If T is non-quadratic residue, then equation (14) is written as:

$$T_{\bar{q}} = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \qquad (16)$$
$$\sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}}$$

where $x_{0,\bar{q}}, x_{1,\bar{q}}, \ldots, x_{nx,\bar{q}}, y_{0,\bar{q}}, y_{1,\bar{q}}, \ldots, y_{ny,\bar{q}} \in F$ denotes the values of $x_0, x_1, \ldots, x_{nx}, y_1, \ldots, y_{ny}$ that result in a non-quadratic residue value of T, denoted as $T_{\bar{q}}$.

Letting g be any non-quadratic residue number in F (i.e., $g \in F(p)$ & $\sqrt{g} \notin F(p)$), then multiplying equation (15) with $g^3$ yields:

$$g^3 T_q = -g^3 \sum_{k \in S_{ny}} a_{1k} y_{k,q}^2 - g^3 \sum_{k,l \in S_{ny}, l \neq k} a_{2kl} y_{k,q} y_{l,q} + g^3 \sum_{l \in S_{nx}} b_{1l} x_{l,q}^3 + g^3 \sum_{l,k \in S_{nx}, l \neq k} b_{2lk} x_{l,q}^2 x_{k,q},$$

which can be re-written as:

$$g^3 T_q = \qquad (17)$$
$$-\sum_{k \in S_{ny}} a_{1k} \left(\sqrt{g^3} \, y_{k,q}\right)^2 - \sum_{k,l \in S_{ny}, l \neq k} a_{2kl} g^3 \left(\sqrt{g^3} \, y_{k,q}\right)\left(\sqrt{g^3} \, y_{l,q}\right) +$$
$$\sum_{l \in S_{nx}} b_{1l} (g x_{l,q})^3 + \sum_{l,k \in S_{nx}, l \neq k} b_{2lk} (g x_{l,q})^2 (g x_{k,q}).$$

It should be noted that if g is non-quadratic residue, then $g^3$ is also non-quadratic residue. Further, the result of multiplying a quadratic residue number by a non-quadratic residue number is a non-quadratic residue number. Thus, $g^3 T_q$ is non-quadratic residue.

By comparing the terms of equations (16) and (17), we obtain the following mappings:

$$x_{1,\bar{q}} = gx_{1,q};\quad (18)$$

$$y_{\bar{q}} = \sqrt{g^3} y_{i,q};\quad (19); \text{ and}$$

$$T_{\bar{q}} = g^3 T_q \quad (20).$$

The mappings between the variables $x_{1,q}$ and $x_{1,\bar{q}}$ in equation (18), $y_{i,q}$ and $y_{i,\bar{q}}$ in equation (19), and $T_q$ and $T_{\bar{q}}$ in equation (20) are all bijective, i.e., there is a one-to-one correspondence from basic finite field arithmetic. As a consequence, the mappings between the (nx+ny+2)-tuple $(x_{0,q}, x_{1,q}, \ldots, x_{nx,q}, T_q, y_{1,q}, \ldots, y_{ny,q})$ and the (nx+ny+2)-tuple $(x_{0,\bar{q}}, x_{1,\bar{q}}, \ldots, x_{nx,\bar{q}}, T_{\bar{q}}, y_{1,\bar{q}}, \ldots, y_{ny,\bar{q}})$ are also bijective.

Therefore, for every solution of equation (15), there is an isomorphic solution that satisfies equation (16), and since the mappings of the coordinates of one to the other are given in equations (18)-(20), these two solutions are isomorphic with respect to each other.

Since $T_q$ is quadratic residue, this expression can be written as:

$$T_q = y_0^2. \quad (21)$$

Thus, from equation (20), $T_{\bar{q}}$ can be written as:

$$T_{\bar{q}} = g^3 Y_0^2 \quad (22).$$

Using equations (21) and (22), equations (15) and (16) can be written as:

$$y_0^2 = -\sum_{k \in S_{ny}} a_{1k} y_{k,q}^2 - \sum_{k,l \in S_{ny}, l \neq k} a_{2kl} y_{k,q} y_{l,q} + \sum_{l \in S_{nx}} b_{1l} x_{l,q}^3 + \sum_{l,k \in S_{nx}, l \neq k} b_{2lk} x_{l,q}^2 x_{k,q}; \quad (23)$$

and $$g^3 y_0^2 = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}}. \quad (24)$$

Since any solution of equation (15) has an isomorphic solution that satisfies equation (16), it follows that the solution of equation (23), denoted as $(x_{0,q}, x_{1,q}, \ldots, x_{nx,q}, y_0, y_{1,q}, \ldots, y_{ny,q})$ has an isomorphic solution that satisfies equation (24), denoted as $(gx_{0,q}, gx_{1,q}, \ldots, gx_{nx,q},$ $$g^{\frac{3}{2}} y_0, g^{\frac{3}{2}} y_{1,q}, \ldots, g^{\frac{3}{2}} y_{ny,q}).$$

The solutions of equation (23) form the points $(x_{0,q}, x_{1,q}, \ldots, x_{nx,q}, y_0, y_{1,q}, \ldots, y_{ny,q})$ that satisfy an elliptic polynomial. Similarly, the solutions of equation (24) form the points $(gx_{0,q}, gx_{1,q}, \ldots, gx_{nx,q},$ $$g^{\frac{3}{2}} y_0, g^{\frac{3}{2}} y_{1,q}, \ldots, g^{\frac{3}{2}} y_{ny,q})$$

that satisfy its twist. This proves the above theorem.

An example of a mapping of the solutions of equation (23) defined over F(p), where p≡3 mod 4, to the solutions of its twist is implemented by using $-x_i$ for the x-coordinates and $-y_i^2$ for the y-coordinates.

The isomorphism between an elliptic polynomial and its twist, discussed above, is exploited for the embedding of the bit sting of a shared secret key into the appropriate x and y coordinates of an elliptic polynomial point without the need for an iterative search for a quadratic residue value of the corresponding $y_0$-coordinate, which usually requires several iterations, where the number of iterations needed is different for different bit strings which are being embedded.

Assuming F=F(p) and that the secret key is an M-bit string such that (nx+ny+1)N>M>N−1, where N is the number of bits needed to represent the elements of F(p), then the secret key bit string is divided into (nx+ny+1) bit-strings $k_{x,0}, k_{x,1}, \ldots, k_{x,nx}, k_{y,1}, \ldots, k_{k,ny}$. The value of the bit-strings $k_{x,0}, k_{x,1}, \ldots, k_{x,nx}, k_{y,1}, \ldots, k_{k,ny}$ must be less than p. In the preferred embodiment of embedding the (nx+ny+1) bit-strings $k_{x,0}, k_{x,1}, \ldots, k_{x,nx}, k_{y,1}, \ldots, k_{k,ny}$, the embedding is as follows.

First, assign the value of the bit string of $k_{x,0}, k_{x,1}, \ldots, k_{x,nx}$ to $x_{x,0}, x_{x,1}, \ldots, x_{x,nx}$. Next, assign the value of the bit string of $k_{y,1}, \ldots, k_{k,ny}$ to $y_{1,k}, \ldots, y_{ny,k}$. Then, compute:

$$T = -\sum_{i \in S_{ny}} a_{1i} y_{i,m}^2 - \sum_{i,l \in S_{ny}, l \neq i} a_{2il} y_{i,m} y_{l,m} + \sum_{l \in S_{nx}} b_{1l} x_{l,m}^3 + \sum_{l,i \in S_{nx}, l \neq i} b_{2li} x_{l,m}^2 x_{i,m}.$$

Finally, use the Legendre test to see if T has a square root. If T has a square root, assign one of the roots to $y_0$; otherwise, the x-coordinates and y-coordinates of the elliptic polynomial point with the embedded shared secret key bit string are given by $gx_{1,k}$ and $$g^{\frac{3}{2}} y_{i,k},$$

respectively, where g is non-quadratic residue in F.

It should be noted that p is usually predetermined prior to encryption, so that the value of g can also be predetermined. Further, the receiver can identify whether the point $(x_{0,k}, x_{1,k}, \ldots, x_{nx,k}, y_{0,k}, y_{1,k}, \ldots, y_{ny,k})$ or the point $(gx_{0,k}, gx_{1,k}, \ldots gx_{nx,k},$ $$g^{\frac{3}{2}} y_{0,k}, g^{\frac{3}{2}} y_{1,k}, \ldots, g^{\frac{3}{2}} y_{ny,k})$$

is the elliptic polynomial point with the embedded secret key bit strings without any additional information. Additionally, any non-quadratic value in F(p) can be used for g. For efficiency, g is chosen to be −1 for p≡3 mod 4 and g is chosen to be 2 for p≡1 mod 4.

The same deterministic and non-iterative method described above can be used to embed a secret message bit string into an elliptic polynomial point in a deterministic and non-iterative manner. Assuming F=F(p) and that the message is an M-bit string such that (nx+ny+1)N>M>N−1, where N is the number of bits needed to represent the elements of F(p), then the message bit string is divided into (nx+ny+1) bit-strings $m_{x,0}, m_{x,1}, \ldots, m_{x,nx}, m_{y,1}, \ldots, m_{k,ny}$. The value of the bit-strings $m_{x,0}, m_{x,1}, \ldots, m_{x,nx}, m_{y,1}, \ldots, m_{k,ny}$ must be less than p. As in the previous embodiment, the embedding of the (nx+ny+1) bit-strings $m_{x,0}, m_{x,1}, \ldots, m_{x,nx}, m_{y,1}, \ldots, m_{k,ny}$ can be accomplished out as follows.

First, assign the value of the bit string of $m_{x,0}, m_{x,1}, \ldots, m_{x,nx}$ to $x_{0,m}, x_{1,m}, \ldots, x_{nx,m}$. Next, assign the value of the bit string of $m_{y,1}, \ldots, m_{k,ny}$ to $y_{1,m}, \ldots, y_{ny,m}$. Then compute:

$$T = -\sum_{i \in S_{ny}} a_{1i}y_{i,m}^2 - \sum_{i,l \in S_{ny}, l \neq i} a_{2li}y_{i,m}y_{l,m} + \sum_{l \in S_{nx}} b_{1l}x_{l,m}^3 + \sum_{l,i \in S_{nx}, l \neq i} b_{2li}x_{l,m}^2 x_{i,m}.$$

Finally, use the Legendre test to see if T has a square root. If T has a square root, then assign one of the roots to $y_0$, otherwise the x-coordinates and y-coordinates of the elliptic polynomial point with the embedded shared secret key bit string are given by $gx_{i,m}$ and $$g^{\frac{3}{2}}y_{i,m},$$

respectively.

It should be noted that p is usually predetermined prior to encryption; thus, the value of g can also be predetermined. Further, when using the above method, the strings $m_{x,0}$, $m_{x,1}, \ldots, m_{x,nx}$ and $m_{y,1}, \ldots, m_{k,ny}$ can be recovered directly from $x_{0,m}, x_{1,m}, \ldots, x_{nx,m}$, and $y_{y,1}, \ldots, y_{ny,m}$, respectively. An extra bit is needed to identify whether $(x_{0,m}, x_{1,m}, \ldots, x_{nx,m}, y_{0,m}, y_{1,m}, \ldots, y_{ny,m})$ or $(gx_{0,m}, gx_{1,m}, \ldots, gx_{nx,m},$ $$g^{\frac{2}{3}}y_{0,m}, g^{\frac{3}{2}}y_{1,m}, \ldots, g^{\frac{3}{2}}y_{ny,m})$$

is used at the sending correspondent. Additionally, any non-quadratic value in F(p) can be used for g. For efficiency, g is chosen to be −1 for p≡3 mod 4 and is chosen to be 2 for p≡1 mod 4. Further, at the receiver, the process is reversed. In the case of g=2, a division by two is carried out. It should noted that dividing $x_{1,m}$ by two is computed using one modulo addition, because:

(i) $x_{1,m}/2 = (x_{1,m} - (x_{1,m}) \mod 2)/2) + (x_{1,m}) \mod 2*(\frac{1}{2}) \mod p$;

(ii) $(x_{1,m}) \mod 2$ is the least significant bit of $x_{1,m}$; and (iii) $(\frac{1}{2}) \mod p = (p+1)/2$.

The following describes the mapping of points that satisfy one elliptic polynomial to points that satisfy another elliptic polynomial. The two elliptic polynomials are not required to be isomorphic with respect to each other. This mapping is used for "hopping" between elliptic polynomials.

The type of elliptic polynomial used for such mapping of points has the following form. The elliptic polynomial is a polynomial with more than two independent variables such that one of the variables, termed the y-coordinate, has a maximum degree of two, and appears on its own in only one of the monomials. The other variables, termed the x-coordinates, have a maximum degree of three, and each must appear in at least one of the monomials with a degree of three. Finally, all monomials that contain x-coordinates must have a total degree of three.

Letting $S_{nx}$ represent the set of numbers from 0 to nx (i.e., $S_{nx} = \{0, \ldots, nx\}$), then given a finite field F and denoting $b_{1l}^{(s)}, b_{2lk}^{(s)} \in F$ as the coefficients of the s-th elliptic polynomial, the following equation defined over F is an example of such an elliptic polynomial:

$$y^2 = \sum_{l \in S_{nx}} b_{1l}^{(s)} x_l^3 + \sum_{l,k \in S_{nx}, l \neq k} b_{2lk}^{(s)} x_l^2 x_k. \quad (25)$$

The following equations are examples of equation (25):

$$y^2 = b_{10}^{(s)} x_0^3 + b_{11}^{(s)} x_1^3 + b_{201}^{(s)} x_0^2 x_1 \quad (26)$$

$$y_0^2 = b_{10}^{(s)} x_0^3 + b_{11}^{(s)} x_1^3 + b_{201}^{(s)} x_0^2 x_1 + b_{201}^{(s)} x_1^2 x_0 \quad (27).$$

Given an elliptic polynomial, such as that given above in equation (25), with coefficients $b_{1l}, b_{2lk1} \in F$, then $(x_{0,o}^{(s)}, x_{0,o}^{(s)}, \ldots, x_{nx,o}^{(s)}, y_o^{(s)})$ is denoted as a point that satisfies the s-th elliptic polynomial. Given another elliptic polynomial that is denoted the r-th polynomial, with coefficients $b_{1l}^{(r)}, b_{2lk}^{(r)} \in F$, then $$y^2 = \sum_{l \in S_{nx}} b_{1l}^{(r)} x_l^3 + \sum_{l,k \in S_{nx}, l \neq k} b_{2lk}^{(r)} x_l^2 x_k,$$

where the r-th elliptic polynomial is not necessarily isomorphic to the s-th elliptic polynomial, i.e., where all or some of the coefficients $b_{1l}^{(r)}, b_{2lk}^{(r)} \in F$ are different and independent of the coefficients $b_{1l}^{(s)}, b_{2lk}^{(s)} \in F$.

Elliptic polynomial hopping refers to hopping the point $(x_{0,o}^{(s)}, x_{0,o}^{(s)}, \ldots, x_{nx,o}^{(s)}, y_o^{(s)})$ that satisfies the one elliptic polynomial (for example, the s-th elliptic polynomial with coefficients $b_{1l}^{(s)}, b_{2lk}^{(s)} \in F$) into an equivalent point $(x_{0,o}^{(r)}, x_{0,o}^{(r)}, \ldots, x_{nx,o}^{(r)}, y_o^{(r)})$ that satisfies the r-th elliptic polynomial with coefficients $b_{1l}^{(r)}, b_{2lk}^{(r)} \in F$.

One method of achieving this is as follows. First, set the x-coordinates of the hopped point $x_{0,o}^{(r)}, x_{1,o}^{(r)}, \ldots, x_{nx,o}^{(r)}$ to the x-coordinates $x_{0,o}^{(s)}, x_{1,o}^{(s)}, \ldots, x_{nx,o}^{(s)}$ of the original point, $x_{1,o}^{(r)} = x_{1,o}^{(s)}$ for i=0, ..., nx. Next, substitute the value of the x-coordinates $x_{0,o}^{(r)}, x_{1,o}^{(r)}, \ldots, x_{nx,o}^{(r)}$ into the new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)}$$

(any value of $x_{0,o}^{(r)}, x_{1,o}^{(r)}, \ldots, x_{nx,o}^{(r)}$ will lead to a value of $T^{(r)} \in F(p)$, where $T^{(r)}$ could be quadratic residue or non-quadratic residue). Finally, if $T^{(r)}$ is quadratic residue, set $y_0^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$; otherwise, if $T^{(r)}$ is a non-quadratic residue, set $y_{0,o}^{(r)} = \sqrt{g^3 T^{(r)}}$ and the hopped point is given by $(gx_{0,o}^{(r)}, gx_{1,o}^{(r)}, \ldots, gx_{nx,o}^{(r)}, y_{0,o}^{(r)})$.

Thus, any point that satisfies an elliptic polynomial can be hopped to an equivalent point on another elliptic polynomial, even if the two polynomials are not isomorphic to each other.

Further, a point is never mapped to another point that satisfies the twist of another elliptic polynomial. As can be seen in the final step above, a point that satisfies an elliptic polynomial is mapped (hopped) to another point that satisfies another elliptic polynomial. Any point that satisfies one elliptic polynomial can be uniquely mapped to another point that satisfies either the equation of an elliptic polynomial or the equation of its twist. In order to show this unique mapping, an additional "-tuple" must be used to indicate as to whether a point that satisfies an elliptic polynomial is mapped to point on another elliptic polynomial or the twist of this other elliptic polynomial.

Thus, for purposes of point mapping between one elliptic polynomial into another, a point is represented as $(x_{0,o}^{(s)}, x_{1,o}^{(s)}, \ldots, x_{nx,o}^{(s)}, y_o^{(s)}, \alpha_o^{(s)})$. The last variable, $\alpha_o^{(s)}$, indicates whether the point $(x_{0,o}^{(s-1)}, x_{1,o}^{(s-1)}, \ldots, x_{nx,o}^{(s-1)}, y_o^{(s-1)}, \alpha_o^{(s-1)})$ that satisfies the previous elliptic polynomial was mapped to an elliptic polynomial or its twist. If $\alpha_o^{(s)} = 1$, the point $(x_{0,o}^{(s-1)}, x_{1,o}^{(s-1)}, \ldots, x_{nx,o}^{(s-1)}, y_o^{(s-1)}, \alpha_o^{(s-1)})$ was originally mapped to a point on the elliptic polynomial, otherwise if $\alpha_o^{(s)} = g$, the point $(x_{0,o}^{(s-1)}, x_{1,o}^{(s-1)}, \ldots, x_{nx,o}^{(s-1)}, y_o^{(s-1)}, \alpha_o^{(s-1)})$ was mapped to a point on the twist of an elliptic polynomial. The addition of the variable $\alpha^{(s)}$ as an extra "-tuple" in the representation of points allows the above procedure to be reversed as follows.

First, if $\alpha_o^{(s)}=1$, the x-coordinates $x_{0,o}^{(s-1)}, x_{1,o}^{(s-1)}, \ldots, x_{nx,o}^{(s-1)}$ are given by $x_{1,o}^{(s-1)}=x_{1,o}^{(s)}$ for i=0, ..., nx; otherwise, if $\alpha_o^{(s)}=g$, the x-coordinates $x_{0,o}^{(s-1)}, x_{1,o}^{(s-1)}, \ldots, x_{nx,o}^{(s-1)}$ are given by $x_{1,o}^{(s-1)}=g^{-1}x_{1,o}^{(s)}$ for i=0, ..., nx. Next, substitute the value of the x-coordinates $(x_{0,o}^{(s-1)}, x_{1,o}^{(s-1)}, \ldots, x_{nx,o}^{(s-1)})$ into the (s−1) elliptic polynomial equation to obtain $$T^{(s-1)} = \sum_{l \in S_{nx}} b_{1l}^{(s-1)}(x_l^{(s-1)})^3 + \sum_{l,k \in S_{nx}, l \neq k} b_{2lk}^{(s-1)}(x_l^{(s-1)})^2 x_k^{(s-1)}.$$

Finally, compute $y_o^{(s-1)} = \sqrt{T^{(s-1)}}$, since it is known that the original point $(x_{0,o}^{(s-1)}, x_{1,o}^{(s-1)}, \ldots, x_{nx,o}^{(s-1)})$ must satisfy the equation of an elliptic polynomial. Thus, $T^{(s-1)}$ is always a quadratic residue.

It should be noted that in the above procedures, the value of $\alpha_o^{(s-1)}$ is not defined, since the value depends on the mapping of the point that satisfies the (s−2) elliptic polynomial into the (s−1) elliptic polynomial. This value of $\alpha_o^{(s-1)}$ must be provided as additional information.

In a first embodiment, the cipher block chaining method utilizes a non-quadratic residue element of F(p), $\overline{\alpha} \in F(p)$, where $\sqrt{\overline{\alpha}} \notin F(p)$. A point which may be located either on an elliptic curve $y^2=x^3+ax+b$ or its twist $\overline{\alpha}y^2=x^3+ax+b$ is represented as $(x, \sqrt{\alpha}y)$, where $\alpha$ is either equal to 1 or $\alpha_o$. If $\alpha=1$, the point $(x,\sqrt{\alpha}y)$ lies on an elliptic curve, while if $\alpha=\overline{\alpha}$, the point lies on its twist. EC represents the set of points that satisfy an elliptic curve equation, and TEC represents the set of points that satisfy its twist. In the following, it is assumed that the maximum block size that can be embedded into an elliptic polynomial is N, and that the message data bit string length is a multiple of (N−L), such as u(N−L), where L is the number of bits that are used to tag each message block to identify its order. In other words, the number of blocks is u, and $u=2^L$. The preferred embodiment of the present method includes the following steps:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$ represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{nx,B}) EC^{nx+ny+2}$ and a base point on the twist of the elliptic polynomial $(x_{0,TB}, x_{1,TB}, \ldots, x_{nx,TB}, \sqrt{\overline{\alpha}}y_{0,TB}, y_{1,TB}, \ldots, y_{nx,TB}) \in EC^{nx+ny+2}$;

the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$ of a key elliptic point $(x_{0,k}, x_{1,k}, \ldots, x_{nx,k}, \sqrt{\alpha_k}y_{0,k}, y_{1,k}, \ldots, y_{ny,k})$ d) computing a scalar multiplication
$(x_{0,TS_0}, x_{1,TS_0}, \ldots, x_{nx,TS_0}, \sqrt{\overline{\alpha}}y_{0,TS_0}, y_{1,TS_0}, \ldots, y_{ny,TS_0}) = k(x_{0,TB}, x_{1,TB}, \ldots, x_{nx,TB}, \sqrt{\overline{\alpha}}y_{0,B}, y_{1,TB}, \ldots, y_{ny,TB})$
if $(x_{0,k}, x_{1,k}, \ldots, x_{nx,k}, \sqrt{\alpha}y_{0,k}, y_{1,k}, \ldots, y_{ny,k})$ is on the elliptic polynomial, wherein $\alpha_k=1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein
if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, x_{ny,B})$
and setting
$(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = (x_{0,k}, x_{1,k}, \ldots, x_{nx,k}, \sqrt{\overline{\alpha}}y_{0,k}, y_{1,k}, \ldots, y_{ny,k})$ e) embedding the message (nx+ny+1) N-bit string of an initial block, which is referred to as the 0-th block, into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

f) computing a set of cipher points as
$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, \sqrt{\alpha}y_{0,S_0}, y_{1,S_0}, \ldots, x_{ny,S_0})$
and
$(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0}) = x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$
if the message point of the 0-th block is on the elliptic polynomial, where $\alpha_{m_0}=1$, wherein if otherwise, the set of cipher points are computed as
$(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0}) = (x_{0,m_0}, x_{1,m_0}, \ldots, x_{nx,m_0}, \sqrt{\overline{\alpha}}y_{0,m_0}, y_{1,m_0}, \ldots, y_{ny,m_0}) + (x_{0,TS_0}, x_{1,TS_0}, \ldots, x_{nx,TS_0}, y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

g) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent, together with any other information needed to recover the message point without sacrificing security if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher $(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0})$ are sent to the receiving correspondent, together with any other information needed to recover the message point without sacrificing security;

h) establishing integers i and u and iteratively repeating the following steps i) through k) until i>u:

i) embedding the message (nx+ny+1) N-bit string of an i-th block into the (nx+1) x-coordinates $x_0, x_1, \ldots, x_{nx}$, and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

j) computing the set of cipher points as
$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$
and
$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}})$
if the message point of the i-th block is on the elliptic polynomial, where $\alpha_{m_i}=1$, wherein if otherwise, the set of cipher points are computed as
$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,m_i}, x_{1,m_i}, \ldots, x_{nx,m_i}, \sqrt{\overline{\alpha}}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, \sqrt{\overline{\alpha}}y_{0,c_{i-1}}, y_{1,c_{i-1}}, \ldots, x_{ny,c_{i-1}})$;

k) sending appropriate bits of the x-coordinates $x_{0,c}$, $x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent, together with any other information needed to recover the message point without sacrificing security if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i})$ are sent to the receiving correspondent, together with any other information needed to recover the message point without sacrificing security;

the receiving correspondent then performs the following steps:

l) embedding the bit string of the secret key into the (nx+1) x-coordinates $x_0, x_1, \ldots, x_{nx}$ and the ny y-coordinates $y_1, \ldots, y_{ny}$ of the key elliptic point $(x_{0,k}, x_{1,k}, \ldots, x_{nx,k}, \sqrt{\alpha_k} y_{0,k}, y_{1,k}, \ldots, y_{ny,k})$;

m) computing a scalar multiplication
$(x_{0,TS_0}, x_{1,TS_0}, \ldots, x_{nx,TS_0}, \sqrt{\alpha} y_{0,TS_0}, y_{1,TS_0}, \ldots, y_{ny,TS_0})$
$k(x_{0,TB}, x_{1,TB}, \ldots, x_{nx,TB}, \sqrt{\alpha} y_{0,B}, y_{1,TB}, \ldots, y_{ny,TB})$
if $(x_{0,k}, x_{1,k}, \ldots, x_{nx,k}, \sqrt{\alpha_k} y_{0,k}, y_{1,k}, \ldots, y_{ny,k})$ is on the elliptic polynomial, where $\alpha_k = -1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{ny,k}, y_{0,k}, y_{1,k}, \ldots, y_{ny,k})$, wherein
if $\alpha_k = \bar{\alpha}$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,k}, x_{1,k}, \ldots, x_{nx,k}, y_{0,k}, y_{1,k}, \ldots, y_{ny,k})$
and setting
$(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = (x_{0,k}, x_{1,k}, \ldots, x_{nx,k}, \sqrt{\alpha} y_{0,k}, y_{1,k}, \ldots, y_{ny,k})$;

n) computing a message point $(x_{0,m_0}, x_{1,m_0}, \ldots, x_{nx,m_0}, y_{0,m_0}, y_{1,m_0}, \ldots, y_{ny,m_0})$ as
$(x_{0,m_0}, x_{1,m_0}, \ldots, x_{nx,m_0}, y_{0,m_0}, y_{1,m_0}, \ldots, y_{ny,m_0}) =$
$(x_{0,c_0}, x_{1,c_0}, \ldots, x_{nx,c_0}, y_{0,c_0}, y_{1,c_0}, \ldots, y_{ny,c_0})$
$-(x_{0,S_0}, x_{1,S_0}, \ldots, x_{nx,S_0}, y_{0,S_0}, y_{1,S_0}, \ldots, x_{ny,S_0})$
and setting
$(x_{0,Tc_0}, x_{1,Tc_0}, \ldots, x_{nx,Tc_0}, \sqrt{\alpha} y_{0,Tc_0}, y_{1,Tc_0}, \ldots, x_{ny,Tc_0}) = x_{0,TS_0}, x_{1,TS_0}, \ldots, x_{nx,TS_0}, \sqrt{\alpha} y_{0,TS_0}, y_{1,TS_0}, \ldots, x_{ny,TS_0}$
if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha} y_{0,m_0}, y_{1,m_0}, \ldots, y_{ny,m_0})$ is computed as
$(x_{0,m_0}, x_{1,m_0}, \ldots, x_{nx,m_0}, \sqrt{\alpha} y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0})$
$-(x_{0,TS_0}, x_{1,TS_0}, \ldots, x_{nx,TS_0}, \sqrt{\alpha} y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

o) recovering the secret message bit string of 0-th block from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha} y_{0,m_0}, y_{1,m_0}, \ldots, y_{ny,m_0})$ if the message point is on the twist of the elliptic polynomial, and using any additional information received from the sending correspondent;

p) setting i=0 and iteratively repeating the following steps q) through r) until i>u:

q) computing the message point $(x_{0,m_i}, x_{1,m_i}, \ldots, x_{nx,m_i}, y_{0,m_i}, y_{1,m_i}, \ldots, y_{ny,m_i})$ as $(x_{0,m_i}, x_{1,m_i}, \ldots, x_{nx,m_i}, y_{0,m_i}, y_{1,m_i}, \ldots, y_{ny,m_i}) =$
$(x_{0,c_i}, x_{1,c_i}, \ldots, x_{nx,c_i}, y_{0,c_i}, y_{1,c_i}, \ldots, y_{ny,c_i})$
$-(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$
and
$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$
if the received cipher point of the i-th block $(x_{0,c_i}, x_{1,c_i}, \ldots, x_{nx,c_i}, y_{0,c_i}, y_{1,c_i}, \ldots, y_{ny,c_i})$ is on the elliptic polynomial, wherein if the received cipher point $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha} y_{0,m_i}, y_{1,m_i}, \ldots, y_{ny,m_i})$ is computed as
$(x_{0,m_i}, x_{1,m_i}, \ldots, x_{nx,m_i}, \sqrt{\alpha} y_{0,m_i}, y_{1,m_i}, \ldots, y_{ny,m_i}) =$
$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i})$
$-(x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;
and r) recovering the secret message bit string of i-th block from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha} y_{0,m_i}, y_{1,m_i}, \ldots, y_{ny,m_i})$ if the message point is on the twist of the elliptic polynomial, and using any additional information received from the sending correspondent.

In an alternative embodiment, the cipher block chaining method includes the following steps:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$ wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{nx,B}) \in EC^{nx+ny+2}$ and a base point on the twist of the elliptic polynomial $(x_{0,TB}, x_{1,TB}, \ldots, x_{nx,TB}, \sqrt{\alpha} y_{0,B}, y_{1,TB}, \ldots, y_{ny,TB}) \in EC^{nx+ny+2}$;

the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k} y_{0,k}, y_{1,k}, \ldots, y_{ny,k})$;

d) computing a scalar multiplication
$(x_{0,TS_0}, x_{1,TS_0}, \ldots, x_{nx,TS_0}, \sqrt{\alpha} y_{0,TS_0}, y_{1,TS_0}, \ldots, y_{ny,TS_0}) =$
$k(x_{0,TB}, x_{1,TB}, \ldots, x_{nx,TB}, \sqrt{\alpha} y_{0,B}, y_{1,TB}, \ldots, y_{ny,TB})$
if $(x_{0,k}, x_{1,k}, \ldots, x_{nx,k}, \sqrt{\alpha_k} y_{0,k}, y_{1,k}, \ldots, y_{ny,k})$ is on the elliptic polynomial, wherein $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein
if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) =$
$k(x_{0,TB}, x_{1,TB}, \ldots, x_{nx,TB}, \sqrt{\alpha} y_{0,B}, y_{1,TB}, \ldots, y_{ny,TB})$ and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

e) embedding the message (nx+ny+1) N-bit string of an initial block, which is referred to as the 0-th block, into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

f) computing a set of cipher points as
$(x_{0,c_0}, x_{1,c_0}, \ldots, x_{nx,c_0}, y_{0,c_0}, y_{1,c_0}, \ldots, y_{ny,c_0}) =$
$(x_{0,m_0}, x_{1,m_0}, \ldots, x_{nx,m_0}, y_{0,m_0}, y_{1,m_0}, \ldots, y_{ny,m_0})$
$+(x_{0,S_0}, x_{1,S_0}, \ldots, x_{nx,S_0}, y_{0,S_0}, y_{1,S_0}, \ldots, x_{ny,S_0})$
and
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) =$
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the message point of the 0-th block is on the elliptic polynomial, where $\alpha_{m_0}=1$, wherein if otherwise, the set of cipher points are computed as
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) =$
$(x_{0,m_0}, x_{1,m_0}, \ldots, x_{nx,m_0}, \sqrt{\alpha}y_{0,m_0}, y_{1,m_0}, \ldots, y_{ny,m_0})$
$+(x_{0,TS_0}, x_{1,TS_0}, \ldots, x_{nx,TS_0}, y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

g) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent, together with any other information needed to recover the message point without sacrificing security if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent, together with any other information needed to recover the message point without sacrificing security;

h) establishing integers i and u and iteratively repeating the following steps i) through l) until i>u:

i) embedding the message (nx+ny+1) N-bit string of an i-th block into the (nx+1) x-coordinates $x_0, x_1, \ldots, x_{nx}$, and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

j) doubling the points $(x_{0,S_i}, x_{1,S_i}, \ldots, x_{nx,S_i}, y_{0,S_i}, y_{1,S_i}, \ldots, x_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$ as
$(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$
and
$(x_{0,TS_i}, x_{1,TS_i}, \ldots, x_{nx,TS_i}, \sqrt{\alpha}y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$,
respectively;

k) computing the set of cipher points as
$(x_{0,c_i}, x_{1,c_i}, \ldots, x_{nx,c_i}, y_{0,c_i}, y_{1,c_i}, \ldots, y_{ny,c_i}) =$
$(x_{0,m_i}, x_{1,m_i}, \ldots, x_{nx,m_i}, y_{0,m_i}, y_{1,m_i}, \ldots, y_{ny,m_i})$
$+(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
if the message point of the i-th block is on the elliptic polynomial, where $\alpha_{m_i}=1$, wherein if otherwise, the set of cipher points are computed as
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,m_i}, x_{1,m_i}, \ldots, x_{nx,m_i}, \sqrt{\alpha}y_{0,m_i}, y_{1,m_i}, \ldots, y_{ny,m_i})$
$+(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;

l) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent, together with any other information needed to recover the message point without sacrificing security if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ are sent to the receiving correspondent, together with any other information needed to recover the message point without sacrificing security;

the receiving correspondent then performs the following steps:

m) embedding the bit string of the secret key into the (nx+1) x-coordinates $x_0, x_1, \ldots, x_{nx}$ and the ny y-coordinates $y_1, \ldots, y_{ny}$ of the key elliptic point $(x_{0,k}, x_{1,k}, \ldots, x_{nx,k}, \sqrt{\alpha_k}y_{0,k}, y_{1,k}, \ldots, y_{ny,k})$;

n) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) =$
$k(x_{0,TB}, x_{1,TB}, \ldots, x_{nx,TB}, \sqrt{\alpha}y_{0,B}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, where $\alpha_k=1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein if $\alpha_k=\alpha$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

o) computing a message point $(x_{0,m_0}, x_{1,m_0}, \ldots, x_{nx,m_0}, \sqrt{y_{0,m_0}}, y_{1,m_0}, \ldots, y_{ny,m_0})$ as
$(x_{0,m_0}, x_{1,m_0}, \ldots, x_{nx,m_0}, y_{0,m_0}, y_{1,m_0}, \ldots, y_{ny,m_0})$
$(x_{0,c_0}, x_{1,c_0}, \ldots, x_{nx,c_0}, y_{0,c_0}, y_{1,c_0}, \ldots, y_{ny,c_0})$
$-(x_{0,S_0}, x_{1,S_0}, \ldots, x_{nx,S_0}, y_{0,S_0}, y_{1,S_0}, \ldots, x_{ny,S_0})$
and setting
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha}y_{0,m_0}, y_{1,m_0}, \ldots, y_{ny,m_0})$ is computed as
$(x_{0,m_0}, x_{1,m_0}, \ldots, x_{nx,m_0}, \sqrt{\alpha}y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$
$-(x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

p) recovering the secret message bit string of 0-th block from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha}y_{0,m_0}, y_{1,m_0}, \ldots, y_{ny,m_0})$ if the message point is on the twist of the elliptic polynomial, and using any additional information received from the sending correspondent;

q) setting i=0 and iteratively repeating the following steps r) through t) until i>u:

r) doubling the points $(x_{0,S_i}, x_{1,S_i}, \ldots, x_{nx,S_i}, y_{0,S_i}, y_{1,S_i}, \ldots, x_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$ as $(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$
and
$(x_{0,TS_i}, x_{1,TS_i}, \ldots, x_{nx,TS_i}, \sqrt{\alpha}y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$,
respectively;

s) computing the message point $(x_{0,m_i}, x_{1,m_i}, \ldots, x_{nx,m_i}, y_{0,m_i}, y_{1,m_i}, \ldots, y_{ny,m_i})$ as $(x_{0,m_i}, x_{1,m_i}, \ldots, x_{nx,m_i}, y_{0,m_i}, y_{1,m_i}, \ldots, y_{ny,m_i}) = (x_{0,c_i}, x_{1,c_i}, \ldots, x_{nx,c_i}, y_{0,c_i}, y_{1,c_i}, \ldots, y_{ny,c_i}) - (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
if the received cipher point of the i-th block $(x_{0,c_i}, x_{1,c_i}, \ldots, x_{nx,c_i}, \sqrt{y_{0,c_i}}, y_{1,c_i}, \ldots, y_{ny,c_i})$ is on the elliptic polynomial, wherein if the received cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha}y_{0,m_i}, y_{1,m_i}, \ldots, y_{ny,m_i})$ is computed as $(x_{0,m_i}, x_{1,m_i}, \ldots, x_{nx,m_i}, \sqrt{\alpha}y_{0,m_i}, y_{1,m_i}, \ldots, y_{ny,m_i}) = (x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) - (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;
and t) recovering the secret message bit string of i-th block from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha}y_{0,m_i}, y_{1,m_i}, \ldots, y_{ny,m_i})$ if the message point is on the twist of the elliptic polynomial, and using any additional information received from the sending correspondent.

In a further alternative embodiment, $S_{m_i}$ represents the N-bit string of the i-th message block. The method includes the following steps:

a) defining a maximum block size that can be embedded into (nx+1) x-coordinates and ny y-coordinates, wherein 17 is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{nx,B}) \in EC^{nx+ny+2}$ and a base point on the twist of the elliptic polynomial $(x_{0,TB}, x_{1,TB}, \ldots, x_{nx,TB}, \sqrt{\alpha}y_{0,TB}, y_{1,TB}, \ldots, y_{nx,TB}) \in EC^{nx+ny+2}$ the sending correspondent and the receiving correspondent further agreeing upon an initial vector $S_{m_{-1}}$;

the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$;

d) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, wherein $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein
if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, y_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

e) computing a message (nx+ny+1) N-bit string as $S'_{m_0}$, $S'_{m_0} = S_{m_0} \oplus S_{m_{-1}}$;

f) embedding the (nx+ny+1) N-bit string $S'_{m_0}$ of an initial block, which is referred to as the 0-th block, into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

g) computing a set of cipher points as
$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, x_{ny,S_0})$
and
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the message point of the 0-th block is on the elliptic curve, where $\alpha_{m_0} = 1$, wherein if otherwise, the set of cipher points are computed as
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha}y_{0,m_0}, y_{1,m_0}, \ldots, y_{ny,m_0}) + (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

h) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent, together with any other information needed to recover the message point without sacrificing security if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent, together with any other information needed to recover the message point without sacrificing security;

i) establishing integers i and u and iteratively repeating the following steps j) through n) until i>u:

j) computing the (nx+ny+1) N-bit string $S'_{m_i}$ as $S'_{m_i} = S'_{m_i} \oplus S_{m_{i-1}}$;

k) embedding the message (nx+ny+1) N-bit string of an i-th block into the (nx+1) x-coordinates $x_0, x_1, \ldots, x_{nx}$, and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

l) doubling the points $(x_{0,S_i}, x_{1,S_i}, \ldots, x_{nx,S_i}, y_{0,S_i}, y_{1,S_i}, \ldots, y_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$ as $(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$
and
$(x_{0,TS_i}, x_{1,TS_i}, \ldots, x_{nx,TS_i}, \sqrt{\alpha}y_{0,TS_i}, y_{1,TS_i}, \ldots, y_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, y_{ny,TS_{i-1}})$,
respectively;

m) computing the set of cipher points as $(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i})$
$+ (x_{0,S_i}, x_{1,S_i}, \ldots, x_{nx,S_i}, y_{0,S_i}, y_{1,S_i}, \ldots, y_{ny,S_i}) + (x_{0,m_{i-1}}, x_{1,m_{i-1}}, \ldots, x_{nx,m_{i-1}}, y_{0,m_{i-1}}, y_{1,m_{i-1}}, \ldots, x_{ny,m_{i-1}})$
and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ if the message point of the i-th block is on the elliptic polynomial, where $\alpha_{m_i}=1$, wherein if otherwise, the set of cipher points are computed as $(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, \sqrt{\alpha}y_{0,m_i}, y_{1,m_i}, \ldots, y_{ny,m_i})$
$+ (x_{0,TS_i}, x_{1,TS_i}, \ldots, x_{nx,TS_i}, \sqrt{\alpha}y_{0,TS_i}, y_{1,TS_i}, \ldots, x_{ny,TS_i}) + (x_{0,m_{i-1}}, x_{1,m_{i-1}}, \ldots, x_{nx,m_{i-1}}, \sqrt{\alpha}y_{0,m_{i-1}}, y_{1,m_{i-1}}, \ldots, x_{ny,m_{i-1}})$
and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;

n) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent, together with any other information needed to recover the message point without sacrificing security if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ are sent to the receiving correspondent, together with any other information needed to recover the message point without sacrificing security;

the receiving correspondent then performs the following steps:

o) embedding the bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$;

p) computing a scalar multiplication $(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$ if $(x_{0,k}, x_{1,k}, \ldots, x_{nx,k}, \sqrt{\alpha_k}y_{0,k}, y_{1,k}, \ldots, y_{ny,k})$ is on the elliptic polynomial, where $\alpha_k=1$, and setting $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein if $\alpha_k=\alpha_o$, then computing a scalar multiplication $(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$ and setting $(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) = (x_{0,k}, x_{1,k}, \ldots, x_{nx,k}, \sqrt{\alpha}y_{0,k}, y_{1,k}, \ldots, y_{ny,k})$;

q) computing a message point $(x_{0,m_0}, x_{1,m_0}, \ldots, x_{nx,m_0}, y_{0,m_0}, y_{1,m_0}, \ldots, y_{ny,m_0})$ as $(x_{0,m_0}, x_{1,m_0}, \ldots, x_{nx,m_0}, y_{0,m_0}, y_{1,m_0}, \ldots, y_{ny,m_0}) =$
$(x_{0,c_0}, x_{1,c_0}, \ldots, x_{nx,c_0}, y_{0,c_0}, y_{1,c_0}, \ldots, y_{ny,c_0})$
$- (x_{0,S_0}, x_{1,S_0}, \ldots, x_{nx,S_0}, y_{0,S_0}, y_{1,S_0}, \ldots, x_{ny,S_0})$ and setting $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = x_{0,TS_0}, x_{1,TS_0}, \ldots, x_{nx,TS_0}, \sqrt{\alpha}y_{0,TS_0}, y_{1,TS_0}, \ldots, x_{ny,TS_0})$ if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha}y_{0,m_0}, y_{1,m_0}, \ldots, y_{ny,m_0})$ is computed as $(x_{0,m_0}, x_{1,m_0}, \ldots, x_{nx,m_0}, \sqrt{\alpha}y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$
$- (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$ and $(x_{0,c_0}, x_{1,c_0}, \ldots, x_{nx,c_0}, \sqrt{\alpha}y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

r) recovering the secret message bit string $S'_{m_0}$ of 0-th block from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha}y_{0,m_0}, y_{1,m_0}, \ldots, y_{ny,m_0})$ if the message point is on the twist of the elliptic polynomial, and using any additional information received from the sending correspondent, and computing the message bit string $S_{m_0}$ as $S_{m_0}=S'_{m_0} \oplus S_{m_{i-1}}$;

s) setting i=0 and iteratively repeating the following steps t) through v) until i>u:

t) doubling the points $(x_{0,S_i}, x_{1,S_i}, \ldots, x_{nx,S_i}, y_{0,S_i}, y_{1,S_i}, \ldots, x_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$ as $(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$, respectively;

u) computing the message point $(x_{0,m_i}, x_{1,m_i}, \ldots, x_{nx,m_i}, y_{0,m_i})$ as $(x_{0,m_i}, x_{1,m_i}, \ldots, x_{nx,m_i}, y_{0,m_i}, y_{1,m_i}, \ldots, y_{ny,m_i}) = (x_{0,c_i}, x_{1,c_i}, \ldots, x_{nx,c_i}, y_{0,c_i}, y_{1,c_i}, \ldots, y_{ny,c_i})$
$- (x_{0,S_i}, x_{1,S_i}, \ldots, x_{nx,S_i}, y_{0,S_i}, y_{1,S_i}, \ldots, x_{ny,S_i}) - (x_{0,m_{i-1}}, x_{1,m_{i-1}}, \ldots, x_{nx,m_{i-1}}, y_{0,m_{i-1}}, y_{1,m_{i-1}}, \ldots, x_{ny,m_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ if the received cipher point of the i-th block $(x_{0,c_i}, x_{1,c_i}, \ldots, x_{nx,c_i}, y_{0,c_i}, y_{1,c_i}, \ldots, y_{ny,c_i})$ is on the elliptic polynomial, wherein if the received cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha}y_{0,m_i}, y_{1,m_i}, \ldots, y_{ny,m_i})$ is computed as $(x_{0,m_i}, x_{1,m_i}, \ldots, x_{nx,m_i}, \sqrt{\alpha}y_{0,m_i}, y_{1,m_i}, \ldots, y_{ny,m_i}) = (x_{0,c_i}, x_{1,c_i}, \ldots, x_{nx,c_i}, \sqrt{\alpha}y_{0,c_i}, y_{1,c_i}, \ldots, y_{ny,c_i})$
$- (x_{0,TS_i}, x_{1,TS_i}, \ldots, x_{nx,TS_i}, \sqrt{\alpha}y_{0,TS_i}, y_{1,TS_i}, \ldots, x_{ny,TS_i}) - (x_{0,m_{i-1}}, x_{1,m_{i-1}}, \ldots, x_{nx,m_{i-1}}, \sqrt{\alpha}y_{0,m_{i-1}}, y_{1,m_{i-1}}, \ldots, x_{ny,m_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,S_{i-1}}, x_{1,S_{i-1}}, \ldots, x_{nx,S_{i-1}}, y_{0,S_{i-1}}, y_{1,S_i}, \ldots, x_{ny,S_{i-1}})$;

and v) recovering the secret message bit string of i-th block from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha}y_{0,m_i}, y_{1,m_i}, \ldots, y_{ny,m_i})$ if the message point is on the twist of the elliptic curve, and using any additional information received from the sending correspondent, and computing the message bit string $S_{m_i}$ as $S_{m_i}=S'_{m_i} \oplus S_{m_{i-1}}$.

In another alternative embodiment, the cipher block chaining method includes the following steps:

a) defining a maximum block size that can be embedded into (nx+1) x-coordinates and ny y-coordinates, wherein n is an integer, and setting the maximum block size to be $(nx+ny+1)N$ bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ and a base point on the twist of the elliptic polynomial) $(x_{0,TB}, x_{1,TB}, \ldots, x_{nx,TB}, y_{0,TB}, y_{1,TB}, \ldots, y_{nx,TB}) \in EC^{nx+ny+2}$;

the sending correspondent then performs the following steps:

c) embedding a bit string of the secret key into the $(nx+1)$ x-coordinates $x_0, x_1, \ldots, x_{nx}$ and the ny y-coordinates $y_1, \ldots, y_{ny}$ of a key elliptic point $(x_{0,k}, x_{1,k}, \ldots, x_{nx,k}, \sqrt{\alpha_k} y_{0,k}, y_{1,k}, \ldots, y_{ny,k})$;

d) computing a scalar multiplication
$(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = k(x_{0,TB}, x_{1,TB}, \ldots, x_{nx,TB}, \sqrt{\alpha} y_{0,B}, y_{1,TB}, \ldots, y_{ny,TB})$
if $(x_{0,k}, x_{1,k}, \ldots, x_{nx,k}, \sqrt{\alpha_k} y_{0,k}, y_{1,k}, \ldots, y_{ny,k})$ is on the elliptic polynomial, wherein $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein
if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = (x_{0,k}, x_{1,k}, \ldots, x_{nx,k}, \sqrt{\alpha} y_{0,k}, y_{1,k}, \ldots, y_{ny,k})$;

e) establishing an integer L and appending an L-bit string identifying a zero value to an $((nx+ny+1)N-L)$ message bit string of an initial block, which is represented as the 0-th message block;

f) embedding the tagged message $(nx+ny+1)$ N-bit string of the 0-th block into the x-coordinate of an elliptic message point
$(x_{0,m_0}, x_{1,m_0}, \ldots, x_{nx,m_0}, \sqrt{\alpha_{m_0}} y_{0,m_0}, y_{1,m_0}, \ldots, y_{ny,m_0})$;

g) computing a set of cipher points as
$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, y_{ny,S_0})$
and
$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha} y_{0,TS_0}, y_{1,TS_0}, \ldots, x_{ny,TS_0})$
if the message point of the 0-th block is on the elliptic polynomial, where $\alpha_{m_0} = 1$, wherein if otherwise, the set of cipher points are computed as
$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha} y_{0,m_0}, y_{1,m_0}, \ldots, y_{ny,m_0}) + (x_{0,TS_0}, x_{1,TS_0}, \ldots, x_{nx,TS_0}, \sqrt{\alpha} y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

h) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent, together with any other information needed to recover the message point without sacrificing security if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0})$ are sent to the receiving correspondent, together with any other information needed to recover the message point without sacrificing security;

i) establishing integers i and u and iteratively repeating the following steps j) through m) until $i > u$:

j) appending an L-bit string that identifies a value of i to the $((nx+ny+1)N-L)$ message bit string;

k) embedding the tagged message $(nx+ny+1)$ N-bit string of the i-th block into the $(nx+1)$ x-coordinates $x_0, x_1, \ldots, x_{nx}$ and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}} y_{0,m_i}, y_{1,m_i}, \ldots, y_{ny,m_i})$;

l) computing the set of cipher points as
$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$
and
$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$
if the message point of the i-th block is on the elliptic polynomial, where $\alpha_{m_i} = 1$, wherein if otherwise, the set of cipher points are computed as
$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha} y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$;

m) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent, together with any other information needed to recover the message point without sacrificing security if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i})$ are sent to the receiving correspondent, together with any other information needed to recover the message point without sacrificing security;

the receiving correspondent then performs the following steps:

n) embedding the bit string of the secret key into the $(nx+1)$ x-coordinates $x_0, x_1, \ldots, x_{nx}$ and the ny y-coordinates $y_1, \ldots, y_{ny}$ of a key elliptic point $(x_{0,k}, x_{1,k}, \ldots, x_{nx,k}, \sqrt{\alpha_k} y_{0,k}, y_{1,k}, \ldots, y_{ny,k})$;

o) computing a scalar multiplication
$(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = k(x_{0,TB}, x_{1,TB}, \ldots, x_{nx,TB}, \sqrt{\alpha} y_{0,B}, y_{1,TB}, \ldots, y_{ny,TB})$
if $(x_{0,k}, x_{1,k}, \ldots, x_{nx,k}, \sqrt{\alpha_k} y_{0,k}, y_{1,k}, \ldots, y_{ny,k})$ is on the elliptic polynomial, where $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$,
wherein if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = (x_{0,k}, x_{1,k}, \ldots, x_{nx,k}, \sqrt{\alpha} y_{0,k}, y_{1,k}, \ldots, y_{ny,k})$;

p) computing a message point $(x_{0,m_0}, x_{1,m_0}, \ldots, x_{nx,m_0}, y_{0,m_0}, y_{1,m_0}, \ldots, y_{ny,m_0})$ as
$(x_{0,m_0}, x_{1,m_0}, \ldots, x_{nx,m_0}, y_{0,m_0}, y_{1,m_0}, \ldots, y_{ny,m_0}) = (x_{0,c_0}, x_{1,c_0}, \ldots, x_{nx,c_0}, y_{0,c_0}, y_{1,c_0}, \ldots, y_{ny,c_0}) - (x_{0,S_0}, x_{1,S_0}, \ldots, x_{nx,S_0}, y_{0,S_0}, y_{1,S_0}, \ldots, x_{ny,S_0})$ and setting
$$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, y_{ny,TS_0})$$

if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha}y_{0,m_0}, y_{1,m_0}, \ldots, y_{ny,m_0})$ is computed as $$(x_{0,m_0}, x_{1,m_0}, \ldots, x_{nx,m_0}, \sqrt{\alpha}y_{0,m_0}, y_{1,m_0}, \ldots, y_{ny,m_0}) =$$
$$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$$
$$-(x_{0,TS_0}, x_{1,TS_0}, \ldots, x_{nx,TS_0}, \sqrt{\alpha}y_{0,TS_0}, y_{1,TS_0}, \ldots, y_{ny,TS_0})$$
and
$$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0});$$

q) recovering the secret message bit string of 0-th block from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha}y_{0,m_0}, y_{1,m_0}, \ldots, y_{ny,m_0})$ if the message point is on the twist of the elliptic polynomial, and using any additional information received from the sending correspondent;

r) setting i=0 and iteratively repeating the following steps s) through t) until i>u:

s) computing the message point $(x_{0,m_i}, x_{1,m_i}, \ldots, x_{nx,m_i}, y_{0,m_i}, y_{1,m_i}, \ldots, y_{ny,m_i})$ as
$$(x_{0,m_i}, x_{1,m_i}, \ldots, x_{nx,m_i}, y_{0,m_i}, y_{1,m_i}, \ldots, y_{ny,m_i}) = (x_{0,c_i}, x_{1,c_i}, \ldots, x_{nx,c_i}, y_{0,c_i}, y_{1,c_i}, \ldots, y_{ny,c_i})$$
$$-(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$$
and
$$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$$
$$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$$

if the received cipher point $(x_{0,c_i}, x_{1,c_i}, \ldots, x_{nx,c_i}, y_{0,c_i}, y_{1,c_i}, \ldots, y_{ny,c_i})$ of the i-th block $(x_{c_i}, y_{c_i})$ is on the elliptic polynomial, wherein if the received cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha}y_{0,m_i}, y_{1,m_i}, \ldots, y_{ny,m_i})$ is computed as
$$(x_{0,m_i}, x_{1,m_i}, \ldots, x_{nx,m_i}, \sqrt{\alpha}y_{0,m_i}, y_{1,m_i}, \ldots, y_{ny,m_i}) =$$
$$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$$
$$-(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$$
and
$$(x_{0,c_i}, x_{1,c_i}, \ldots, x_{nx,c_i}, y_{0,c_i}, y_{1,c_i}, \ldots, y_{ny,c_i}) =$$
$$(x_{0,c_{i-1}}, x_{1,c_{i-1}}, \ldots, x_{nx,c_{i-1}}, y_{0,c_{i-1}}, y_{1,S_i}, \ldots, x_{ny,c_{i-1}});$$
and t) recovering the secret message bit string of i-th block from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha}y_{0,m_i}, y_{1,m_i}, \ldots, y_{ny,m_i})$ if the message point is on the twist of the elliptic curve, and using any additional information received from the sending correspondent.

Blind randomization may also be used with the present method. In blind randomization, the receiving correspondent does not need to know the mechanisms used by the sending correspondent to generate the random bits that are inserted in each encrypted block. In other words, there is no need to synchronize the randomization between the sending and receiving correspondent. Blind randomization will reduce the chances of collisions exploited in birthday attacks, since the same message bit string will be coded into two different cipher texts when using two different random bit strings. In an alternative embodiment incorporating blind randomization, the cipher block chaining method includes the following steps:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ and a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in EC^{nx+ny+2}$ the sending and receiving correspondents further agreeing upon the number of message bits and their positions to be inserted in the (nx+ny+1) N-bit blocks to be encrypted, wherein $N_m$ represents the number of bits to inserted in the (nx+ny+1) N-bit block, where $N_m < (nx+ny+1)N$, the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$;

d) computing a scalar multiplication
$$(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) =$$
$$k(x_{0,TB}, x_{1,TB}, \ldots, x_{nx,TB}, \sqrt{\alpha}y_{0,B}, y_{1,TB}, \ldots, y_{ny,TB})$$

if $(x_{0,k}, x_{1,k}, \ldots, x_{nx,k}, \sqrt{\alpha_k}y_{0,k}, y_{1,k}, \ldots, y_{ny,k})$ is on the elliptic polynomial, wherein $\alpha_k = 1$, and setting
$$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$$, wherein if $\alpha_k = \alpha_o$, then computing a scalar multiplication
$$(x_{0,S_0}, x_{1,S_0}, \ldots, x_{nx,S_0}, y_{0,S_0}, y_{1,S_0}, \ldots, x_{ny,S_0}) =$$
$$k(x_{0,B}, x_{1,B}, \ldots, x_{nx,B}, y_{0,B}, y_{1,B}, \ldots, y_{ny,B})$$
and setting
$$(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) = (x_{0,k}, x_{1,k}, \ldots, x_{nx,k}, \sqrt{\alpha}y_{0,k}, y_{1,k}, \ldots, y_{ny,k});$$

e) generating $((nx+ny+1)N-N_m)$ bits at random using an $((nx+ny+1)N-N_m)$-bit random number generator and forming a block to be encrypted $B_{m_0}$ by inserting the $N_m$ message bits of the initial block and the random $((nx+ny+1)N-N_m)$ bits in the appropriate positions of the block;

f) embedding the tagged message (nx+ny+1) N-bit string of the 0-th block into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

g) computing a set of cipher points as
$$(x_{0,c_0}, x_{1,c_0}, \ldots, x_{nx,c_0}, y_{0,c_0}, y_{1,c_0}, \ldots, y_{ny,c_0}) =$$
$$(x_{0,m_0}, x_{1,m_0}, \ldots, x_{nx,m_0}, y_{0,m_0}, y_{1,m_0}, \ldots, y_{ny,m_0})$$
$$+(x_{0,S_0}, x_{1,S_0}, \ldots, x_{nx,S_0}, y_{0,S_0}, y_{1,S_0}, \ldots, x_{ny,S_0})$$
and
$$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$$

if the message point of the 0-th block is on the elliptic polynomial, where $\alpha_{m_0} = 1$, wherein if otherwise, the set of cipher points are computed as
$$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) =$$
$$(x_{0,m_0}, x_{1,m_0}, \ldots, x_{nx,m_0}, \sqrt{\alpha}y_{0,m_0}, y_{1,m_0}, \ldots, y_{ny,m_0})$$
$$+(x_{0,TS_0}, x_{1,TS_0}, \ldots, x_{nx,TS_0}, \sqrt{\alpha}y_{0,TS_0}, y_{1,TS_0}, \ldots, x_{ny,TS_0})$$

and $(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

h) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent, together with any other information needed to recover the message point without sacrificing security if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent, together with any other information needed to recover the message point without sacrificing security;

i) establishing integers i and u and iteratively repeating the following steps j) through m) until $i > u$:

j) generating $((nx+ny+1)N - N_m)$ bits at random using the $((nx+ny+1)N - N_m)$-bit random number generator and forming a block to be encrypted $B_m$, by inserting the $N_m$ message bits of an i-th block and the random $((nx+ny+1)N - N_m)$ bits in the appropriate positions of the block;

k) embedding the tagged message $(nx+ny+1)$ N-bit string of the i-th block into the $(nx+1)$ x-coordinates $x_0, x_1, \ldots, x_{nx}$ and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

l) computing the set of cipher points as $(x_{0,c_i}, x_{1,c_i}, \ldots, x_{nx,c_i}, y_{0,c_i}, y_{1,c_i}, \ldots, y_{ny,c_i}) =$
$(x_{0,m_i}, x_{1,m_i}, \ldots, x_{nx,m_i}, y_{0,m_i}, y_{1,m_i}, \ldots, y_{ny,m_i})$
$(x_{0,c_{i-1}}, x_{1,c_{i-1}}, \ldots, x_{nx,c_{i-1}}, \sqrt{\alpha}y_{0,c_{i-1}}, y_{1,c_{i-1}}, \ldots, y_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
if the message point of the i-th block is on the elliptic polynomial, where $\alpha_{m_i} = 1$, wherein if otherwise, the set of cipher points are computed as $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,m_i}, x_{1,m_i}, \ldots, x_{nx,m_i}, \sqrt{\alpha}y_{0,m_i}, y_{1,m_i}, \ldots, y_{ny,m_i})$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) =$
$(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ m) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,m_0}, x_{1,m_0}, \ldots, x_{nx,m_0}, y_{0,m_0}, y_{1,m_0}, \ldots, y_{ny,m_0})$ to the receiving correspondent, together with any other information needed to recover the message point without sacrificing security if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,c_i}, x_{1,c_i}, \ldots, x_{nx,c_i}, \sqrt{\alpha}y_{0,c_i}, y_{1,c_i}, \ldots, y_{ny,c_i})$ are sent to the receiving correspondent, together with any other information needed to recover the message point without sacrificing security;

the receiving correspondent then performs the following steps:

n) embedding the bit string of the secret key into the $(nx+1)$ x-coordinates $x_0, x_1, \ldots, x_{nx}$ and the ny y-coordinates $y_1, \ldots, y_{ny}$ of a key elliptic point $(x_{0,k}, x_{1,k}, \ldots, x_{nx,k}, \sqrt{\alpha_k}y_{0,k}, y_{1,k}, \ldots, y_{ny,k})$;

o) computing a scalar multiplication $(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$ if $(x_{0,k}, x_{1,k}, \ldots, x_{nx,k}, \sqrt{\alpha_k}y_{0,k}, y_{1,k}, \ldots, y_{ny,k})$ is on the elliptic polynomial, where $\alpha_k = 1$, and setting $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein if $\alpha_k = \alpha_o$, then computing a scalar multiplication $(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, \sqrt{\alpha}y_{0,B}, y_{1,B}, \ldots, y_{ny,B})$ and setting $(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

p) computing a message point $(x_{0,m_0}, x_{1,m_0}, \ldots, x_{nx,m_0}, y_{0,m_0}, y_{1,m_0}, \ldots, y_{ny,m_0})$ as $(x_{0,m_0}, x_{1,m_0}, \ldots, x_{nx,m_0}, y_{0,m_0}, y_{1,m_0}, \ldots, y_{ny,m_0}) =$
$(x_{0,c_0}, x_{1,c_0}, \ldots, x_{nx,c_0}, y_{0,c_0}, y_{1,c_0}, \ldots, y_{ny,c_0})$
$-(x_{0,S_0}, x_{1,S_0}, \ldots, x_{nx,S_0}, y_{0,S_0}, y_{1,S_0}, \ldots, x_{ny,S_0})$ and setting $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$ if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha}y_{0,m_0}, y_{1,m_0}, \ldots, y_{ny,m_0})$ is computed as $(x_{0,m_0}, x_{1,m_0}, \ldots, x_{nx,m_0}, \sqrt{\alpha}y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$
$-(x_{0,TS_0}, x_{1,TS_0}, \ldots, x_{nx,TS_0}, \sqrt{\alpha}y_{0,TS_0}, y_{1,TS_0}, \ldots, x_{ny,TS_0})$ and $(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

q) recovering the bit string of 0-th block $B_{m_0}$ from the $(nx+1)$ x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the $(nx+1)$ x-coordinates and the ny y-coordinates of the point $(x_{0,m_0}, x_{1,m_0}, \ldots, x_{nx,m_0}, \sqrt{\alpha}y_{0,m_0}, y_{1,m_0}, \ldots, y_{ny,m_0})$ if the message point is on the twist of the elliptic polynomial, and using any additional information received from the sending correspondent;

r) setting $i = 0$ and iteratively repeating the following steps s) through t) until $i > u$:

s) computing the message point $(x_{0,m_i}, x_{1,m_i}, \ldots, x_{nx,m_i}, y_{0,m_i}, y_{1,m_i}, \ldots, y_{ny,m_i})$ as $(x_{0,m_i}, x_{1,m_i}, \ldots, x_{nx,m_i}, y_{0,m_i}, y_{1,m_i}, \ldots, y_{ny,m_i}) = (x_{0,c_i}, x_{1,c_i}, \ldots, x_{nx,c_i}, y_{0,c_i}, y_{1,c_i}, \ldots, y_{ny,c_i})$
$-(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$
if the received cipher point $(x_{0,c_i}, x_{1,c_i}, \ldots, x_{nx,c_i}, y_{0,c_i}, y_{1,c_i}, \ldots, y_{ny,c_i})$ of the i-th block $(x_{c_i}, y_{c_i})$ is on the elliptic polynomial, wherein if the received cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha}y_{0,m_i}, y_{1,m_i}, \ldots, y_{ny,m_i})$ is computed as $(x_{0,m_i}, x_{1,m_i}, \ldots, x_{nx,m_i}, \sqrt{\alpha}y_{0,m_i}, y_{1,m_i}, \ldots, y_{ny,m_i}) =$
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$
$-(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) =$
$(x_{0,c_{i-1}}, x_{1,c_{i-1}}, \ldots, x_{nx,c_{i-1}}, y_{0,c_{i-1}}, y_{1,S_i}, \ldots, x_{ny,c_{i-1}})$;

and t) recovering the bit string of i-th block $B_{m_i}$ from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha}y_{0,m_i}, y_{1,m_i}, \ldots, y_{ny,m_i})$ if the message point is on the twist of the elliptic curve, and using any additional information received from the sending correspondent.

In an alternative embodiment of the blind randomization technique, the method includes the steps of:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ and a base point on the twist of the elliptic polynomial $(x_{0,TB}, x_{1,TB}, \ldots, x_{nx,TB}, \sqrt{\alpha}y_{0,TB}, y_{1,TB}, \ldots, y_{ny,TB}) \in TEC^{nx+ny+2}$, the sending and receiving correspondents further agreeing upon the number of message bits and their positions to be inserted in the i-th (nx+ny+1) N-bit block to be encrypted, and a code list for each selected number of message bits and the corresponding positions, wherein $N_e$ represents the number of bits needed to represent the code list, where $(N_m + N_e) \leq (nx+ny+1)N$, $N_m$ representing the number of message bits;

the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$;

d) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) =$
$k(x_{0,TB}, x_{1,TB}, \ldots, x_{nx,TB}, \sqrt{\alpha}y_{0,TB}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, wherein $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein
if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) =$
$k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

e) selecting a code that identifies the number of message bits to be inserted in the 0-th block and generating $((nx+ny+1)N - N_m - N_e)$ bits at random using a random number generator, and further forming a block to be encrypted $B_{m_0}$ by inserting the $N_m$ message bits of the initial block and the random $((nx+ny+1)N - N_m - N_e)$ bits in the appropriate positions of the block and appending the bits $N_e$ of the code bits;

f) embedding the (nx+ny+1) N-bit string of the 0-th block $B_{m_0}$ into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$ g) computing a set of cipher points as
$(x_{0,c_0}, x_{1,c_0}, \ldots, x_{nx,c_0}, y_{0,c_0}, y_{1,c_0}, \ldots, y_{ny,c_0}) =$
$(x_{0,m_0}, x_{1,m_0}, \ldots, x_{nx,m_0}, y_{0,m_0}, y_{1,m_0}, \ldots, y_{ny,m_0})$
$+ (x_{0,S_0}, x_{1,S_0}, \ldots, x_{nx,S_0}, y_{0,S_0}, y_{1,S_0}, \ldots, x_{ny,S_0})$
and
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the message point of the 0-th block is on the elliptic polynomial, where $\alpha_{m_0} = 1$, wherein if otherwise, the set of cipher points are computed as
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) =$
$(x_{0,m_0}, x_{1,m_0}, \ldots, x_{nx,m_0}, \sqrt{\alpha}y_{0,m_0}, y_{1,m_0}, \ldots, y_{ny,m_0})$
$+ (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, y_{ny,S_0})$;

h) sending appropriate bits of the x-coordinates $x_{0,c}, x_{1,c}, \ldots, x_{nx}$, and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent, together with any other information needed to recover the message point without sacrificing security if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent, together with any other information needed to recover the message point without sacrificing security;

i) establishing integers i and u and iteratively repeating the following steps j) through m) until i>u:

j) selecting a code that identifies the number of message bits to be inserted in the 0-th block and generating $((nx+ny+1)N - N_m - N_e)$ bits at random using a random number generator, and further forming the block to be encrypted $B_{m_i}$ by inserting the $N_m$ message bits of the initial block and the random $((nx+ny+1)N - N_m - N_e)$ bits in the appropriate positions of the block and appending the bits $N_e$ of the code bits;

k) embedding the (nx+ny+1) N-bit string of the i-th block into the (nx+1) x-coordinates $x_0, x_1, \ldots, x_{nx}$ and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

l) computing the set of cipher points as
$(x_{0,c_i}, x_{1,c_i}, \ldots, x_{nx,c_i}, y_{0,c_i}, y_{1,c_i}, \ldots, y_{ny,c_i}) =$
$(x_{0,m_i}, x_{1,m_i}, \ldots, x_{nx,m_i}, y_{0,m_i}, y_{1,m_i}, \ldots, y_{ny,m_i})$
$+ (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$
if the message point of the i-th block is on the elliptic polynomial, where $\alpha_{m_i} = 1$, wherein if otherwise, the set of cipher points are computed as
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,m_i}, x_{1,m_i}, \ldots, x_{nx,m_i}, \sqrt{\alpha}y_{0,m_i}, y_{1,m_i}, \ldots, y_{ny,m_i})$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) =$
$(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;

m) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent, together with any other information needed to recover the message point without sacrificing security if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc}, x_{1,Tc}, \ldots, x_{nx,Tc}, \sqrt{\overline{\alpha}}y_{0,Tc}, y_{1,Tc}, \ldots, y_{ny,Tc})$ are sent to the receiving correspondent, together with any other information needed to recover the message point without sacrificing security;

the receiving correspondent then performs the following steps:

n) embedding the bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$;

o) computing a scalar multiplication $(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = k$
$(x_{0,TB}, x_{1,TB}, \ldots, x_{nx,TB}, \sqrt{\overline{\alpha}}y_{0,TB}, y_{1,TB}, \ldots, y_{ny,TB})$ if $(x_{0,k}, x_{1,k}, \ldots, x_{nx,k}, \sqrt{\alpha_k}y_{0,k}, y_{1,k}, \ldots, y_{ny,k})$ is on the elliptic polynomial, where $\alpha_k = 1$, and setting $(x_{0,S_0}, x_{1,S_0}, \ldots, x_{nx,S_0}, y_{0,S_0}, y_{1,S_0}, \ldots, y_{ny,S_0}) = k (x_{0,k}, x_{1,k}, \ldots, x_{nx,k}, y_{0,k}, y_{1,k}, \ldots, y_{ny,k})$, wherein if $\alpha_k = \alpha_o$, then computing a scalar multiplication $(x_{0,S_0}, x_{1,S_0}, \ldots, x_{nx,S_0}, y_{0,S_0}, y_{1,S_0}, \ldots, x_{ny,S_0}) = k (x_{0,B}, x_{1,B}, \ldots, x_{nx,B}, y_{0,B}, y_{1,B}, \ldots, y_{ny,B})$ and setting $(x_{0,TS_0}, x_{1,TS_0}, \ldots, x_{nx,TS_0}, \sqrt{\overline{\alpha}}y_{0,TS_0}, y_{1,TS_0}, \ldots, y_{ny,TS_0}) = (x_{0,k}, x_{1,k}, \ldots, x_{nx,k}, \sqrt{\overline{\alpha}}y_{0,k}, y_{1,k}, \ldots, y_{ny,k})$;

p) computing a message point $(x_{0,m_0}, x_{1,m_0}, \ldots, x_{nx,m_0}, y_{0,m_0}, y_{1,m_0}, \ldots, y_{ny,m_0})$ as $(x_{0,m_0}, x_{1,m_0}, \ldots, x_{nx,m_0}, y_{0,m_0}, y_{1,m_0}, \ldots, y_{ny,m_0}) =$
$(x_{0,c_0}, x_{1,c_0}, \ldots, x_{nx,c_0}, y_{0,c_0}, y_{1,c_0}, \ldots, y_{ny,c_0})$
$- (x_{0,S_0}, x_{1,S_0}, \ldots, x_{nx,S_0}, \sqrt{\overline{\alpha}}y_{0,S_0}, y_{1,S_0}, \ldots, y_{ny,S_0})$ and setting $(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0}) = x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$ if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\overline{\alpha}}y_{0,m_0}, y_{1,m_0}, \ldots, y_{ny,m_0})$ is computed as $(x_{0,m_0}, x_{1,m_0}, \ldots, x_{nx,m_0}, \sqrt{\overline{\alpha}}y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0})$
$- (x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$ and $(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, y_{ny,S_0})$;

q) recovering the bit string of 0-th block $B_{m_0}$ from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\overline{\alpha}}y_{0,m_0}, y_{1,m_0}, \ldots, y_{ny,m_0})$ if the message point is on the twist of the elliptic polynomial, and using any additional information received from the sending correspondent, and further recovering a set of code bits which specify the number of message bits and their locations in the 0-th block $B_{m_0}$, and recovering the initial $N_m$ message bits from the bit string of $B_{m_0}$;

r) setting i=0 and iteratively repeating the following steps s) through t) until i>u:

s) computing the message point $(x_{0,m_i}, x_{1,m_i}, \ldots, x_{nx,m_i}, y_{0,m_i}, y_{1,m_i}, \ldots, y_{ny,m_i})$ as)

$(x_{0,m_i}, x_{1,m_i}, \ldots, x_{nx,m_i}, y_{0,m_i}, y_{1,m_i}, \ldots, y_{ny,m_i}) = (x_{0,c_i}, x_{1,c_i}, \ldots, x_{nx,c_i}, y_{0,c_i}, y_{1,c_i}, \ldots, y_{ny,c_i})$
$- (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$ and $(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) =$
$(x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}})$ if the received cipher point $(x_{0,c_i}, x_{1,c_i}, \ldots, x_{nx,c_i}, y_{0,c_i}, y_{1,c_i}, \ldots, y_{ny,c_i})$ of the i-th block $(x_{c_i}, y_{c_i})$ is on the elliptic polynomial, wherein if the received cipher point $(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\overline{\alpha}}y_{0,m_i}, y_{1,m_i}, \ldots, y_{ny,m_i})$ is computed as $(x_{0,m_i}, x_{1,m_i}, \ldots, x_{nx,m_i}, \sqrt{\overline{\alpha}}y_{0,m_i}, y_{1,m_i}, \ldots, y_{ny,m_i}) =$
$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i})$
$- (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}})$ and $(x_{0,c_i}, x_{1,c_i}, \ldots, x_{nx,c_i}, y_{0,c_i}, y_{1,c_i}, \ldots, y_{ny,c_i}) =$
$(x_{0,c_{i-1}}, x_{1,c_{i-1}}, \ldots, x_{nx,c_{i-1}}, y_{0,c_{i-1}}, y_{1,S}, \ldots, x_{ny,c_{i-1}})$;

and t) recovering the bit string of i-th block $B_{m_i}$ from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\overline{\alpha}}y_{0,m_i}, y_{1,m_i}, \ldots, y_{ny,m_i})$ if the message point is on the twist of the elliptic polynomial, and using any additional information received from the sending correspondent, and further recovering the set of code bits specifying the number of message bits and their locations in the i-th block $B_{m_i}$, and recovering the initial $N_m$ message bits from the bit string of $B_{m_i}$.

As noted above, the methods include data embedding. In order to embed a message bit string into a point $(x, \sqrt{\overline{\alpha}}y)$ which satisfies either an elliptic curve equation $y^2 = x^3 + ax + b$ or its twist, $\overline{\alpha}y^2 = x^3 + ax + b$, the message bit string is first divided into N-bit strings and the $i^{th}$ block is denoted as $m_i$. Following this, the value of the bit string of $m_i$ is assigned to $x_{m_i}$, and the values of $x_{m_i}$ are substituted and the value of $t_{m_i}$ is computed using $t_{m_i} = x_{m_i}^3 + ax_{m_i} + b$.

If $t_{m_i}$ is quadratic residue, then $y_{m_i} = \sqrt{t_{m_i}}$ and the point is given as $(x_{m_i}, y_{m_i})$. However, if $t_{m_i}$ is non-quadratic residue, then $$y_{m_i} = \sqrt{\frac{t_{m_i}}{\overline{\alpha}}}$$

and the point is given as $(x_{m_i}, \sqrt{\overline{\alpha}}y_{m_i})$. The message point is then denoted as $(x_{m_i}, \sqrt{\alpha_{m_i}}y_{m_i})$, where the point is on the elliptic curve if $\alpha_{m_i} = 1$, and the point is on the twist if $\alpha_{m_i} = \overline{\alpha}$.

Alternatively, data embedding may be performed as follows:

a) dividing the message bit string into (nx+ny+1) bit-strings $m_{x,0}, m_{x,1}, \ldots, m_{x,nx}, m_{y,1}, \ldots, m_{k,ny}$;

b) assigning the value of the bit string of $m_{x,0}, m_{x,1}, \ldots, m_{x,nx}$ to $x_{0,m}, x_{1,m}, \ldots, x_{nx,m}$;

c) assigning the value of the bit string of $m_{y,1}, \ldots, m_{k,ny}$ to $y_{1,m}, \ldots, y_{ny,m}$;

d) computing $$T^{(s-1)} = \sum_{l \in S_{nx}} b_{1l} x_l^3 + \sum_{l,k \in S_{nx}, l \neq k} b_{2lk} x_l^2 x_k;$$

and e) performing a Legendre test to determine if T has a square root, wherein if T has a square root, then assigning the square root to $y_0$, and if T does not have a square root, then the x-coordinates and y-coordinates of the elliptic curve point with the embedded shared secret key bit string are selected as $gx_{i,m}$ and $$g^{\frac{3}{2}} y_{i,m},$$

respectively, where g is non-quadratic residue in F.

As a hybrid of these techniques, the embedding may be performed as:

a) dividing the message bit string into N-bit strings, wherein the i-th block is given by $m_i$;

b) assigning the value of the bit string of $m_i$ to $x_{m_i}$;

c) substituting the values of $x_{m_i}$ and computing a residue value $t_{m_i}$ as $t_{m_i} = x_{m_i}^3 + ax_{m_i} + b$, wherein if $t_{m_i}$ quadratic residue such that $y_{m_i} = \sqrt{t_{m_i}}$, then the message point is embedded as $(x_{m_i}, y_{m_i})$, and if $t_{m_i}$ is non-quadratic residue such that $$y_{m_i} = \sqrt{\frac{t_{m_i}}{\overline{\alpha}}},$$

then the message point is embedded $(x_{m_i}, \sqrt{\overline{\alpha}} y_{m_i})$.

As a further alternative to the above, the data embedding may be performed as follows:

a) dividing the message bit string into (nx+ny+1) bit-strings $m_{x,0}, m_{x,1}, \ldots, m_{x,nx}, m_{y,1}, \ldots, m_{k,ny}$, wherein the length of string $m_{x,0}$ is less than or equal to (N−L) bits, and the length of each of the other bit-strings are each less than or equal to N bits, wherein each of the (nx+ny+1) bit strings has an equivalent value which is an element of the underlying field F;

b) assigning the value of the bit string of $m_{x,1}, \ldots, m_{x,2}, \ldots, m_{x,nx}$ to $x_{1,m}, x_{2,m}, \ldots, x_{nx,m}$;

c) assigning the value of the bit string of $m_{y,1}, \ldots, m_{k,ny}$ to $y_{1,m}, \ldots, y_{ny,m}$;

d) assigning the value of the bit string of $m_{x,0}$ to $x_0$;

e) substituting the values of $x_0, x_1, \ldots, x_{nx}$ and $y_1, \ldots, y_{ny}$ in a selected elliptic polynomial equation with (nx+1) x-coordinates and (ny+1) y-coordinates to form a quadratic equation in $y_0$ of the form $y_0^2 + Ay_0 + B = 0$;

f) if the quadratic equation in $y_0$ has solutions $\overline{y}_{0,1}, \overline{y}_{0,2}$, wherein the solutions are elements of the finite field F, then assigning one of the solutions to $y_0$ randomly, the message point being given by $(x_{0,m}, x_{1,m}, \ldots, x_{nx,m}, y_{0,m}, y_{1,m}, \ldots, y_{ny,m})$, otherwise assigning one of the solutions $\sqrt{\overline{\alpha}} \overline{y}_{0,1}, \sqrt{\overline{\alpha}} \overline{y}_{0,2}$ to $y_0$ randomly, the message point being given by $(x_{0,m}, x_{1,m}, \ldots, x_{nx,m}, \sqrt{\overline{\alpha}} y_{0,m}, y_{1,m}, \ldots, y_{ny,m})$; and g) the message point being embedded as $(x_{0,m}, x_{1,m}, \ldots, x_{nx,m}, \sqrt{\overline{\alpha}} y_{0,m}, y_{1,m}, \ldots, y_{ny,m})$, where the message point is on the elliptic polynomial if $\alpha_{m_i} = 1$, and the point is on the twist of the elliptic polynomial if $\alpha_{m_i} = \overline{\alpha}$.

It should be noted that in the case of quadratic equations with A=0, the Legendre symbol can be used as an efficient test for the existence of a solution of the quadratic equation above.

The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as $$\left(\frac{d}{p}\right).$$

In order to test whether d is quadratic residue or not, the Legendre symbol, $$\left(\frac{d}{p}\right),$$

is computed such that $$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

In the above, the password protocols use the scalar multiplication $k_m(x_{Pu}, y_{Pu})$. It should be noted that, in order to find a collision means, that there are two message bits strings m and m' such that their integer values $k_m$ and $k_{m'}$ will lead to $k_m k(x_B, y_B) \equiv k_m k(x_B, y_B)$. This collision implies that integers can be found such that $k_m k - k_m k = 1 * \#EC$, where #EC is the order of the group (EC,+). This is equivalent to solving the elliptic polynomial discrete logarithm problem. This also applies to finding a collision for the points on the twist of an elliptic curve, $k_m k(x_{TB}, \sqrt{\overline{\alpha}} y_{TB}) = k_m k(x_{TB}, \sqrt{\overline{\alpha}} y_{TB})$.

Thus, security of the password protocols depends on the security of the underlying elliptic polynomial cryptography. The security of elliptic curve cryptosystems is assessed by both the effect on the solution of the elliptic polynomial discrete logarithmic problem (ECDLP) and power analysis attacks.

It is well known that the elliptic polynomial discrete logarithm problem (ECDLP) is apparently intractable for non-singular elliptic curves. The ECDLP problem can be stated as follows: given an elliptic curve defined over F that needs N-bits for the representation of its elements, an elliptic curve point $(x_P, y_P) \in EC$, defined in affine coordinates, and a point $(x_Q, y_Q) \in EC$, defined in affine coordinates, determine the integer k, $0 \leq k \leq \#F$, such that $(x_Q, y_Q) = k(x_P, y_P)$, provided that such an integer exists. In the below, it is assumed that such an integer exists.

The most well known attack used against the ECDLP is the Pollard p-method, which has a complexity of $O(\sqrt{\pi K}/2)$, where K is the order of the underlying group, and the complexity is measured in terms of an elliptic curve point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

Projective coordinate can also be used by the sending correspondent and the receiving correspondent to embed extra message data bits in the projective coordinate wherein the addition of the corresponding elliptic points is defined in (nx+ny+3) dimensional space where there are (nx+1) x-coordinates, (ny+1) y-coordinates and one projective coordinate.

The equations for the addition rule can be obtained by using the elliptic curve equation with (nx+1) x-coordinates and (nx+1) y-coordinates in projective coordinates and substituting a straight line equation to obtain a cubic equation in terms of one of the x-coordinates. This cubic equation can be used to identify the third point of intersection between a straight line and the elliptic curve in (nx+ny+3) dimensions given two other intersection points. This third point of intersection is used to identify the sum of the given two points.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method of performing cipher block chaining using elliptic polynomial cryptography, comprising the steps of:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ and a base point on the twist of the elliptic polynomial
$(x_{0,TB}, x_{1,TB}, \ldots, x_{nx,TB}, \sqrt{\alpha}y_{0,B}, y_{1,TB}, \ldots, y_{ny,TB})$
$\in TEC^{nx+ny+2}$;
the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$;

d) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) =$
$k(x_{0,TB}, x_{1,TB}, \ldots, x_{nx,TB}, \sqrt{\alpha}y_{0,B}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, wherein $\alpha_k=1$, and setting
$(x_{0,S_0}, x_{1,S_0}, \ldots, x_{nx,S_0}, y_{0,S_0}, y_{1,S_0}, \ldots, y_{ny,S_0}) = (x_{0,k}, x_{1,k}, \ldots, x_{nx,k}, y_{0,k}, y_{1,k}, \ldots, y_{ny,k})$, wherein
if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, y_{ny,S_0}) =$
$k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) =$
$(x_{0,k}, x_{1,k}, \ldots, x_{nx,k}, \sqrt{\alpha}y_{0,k}, y_{1,k}, \ldots, y_{ny,k})$;

e) embedding the message (nx+ny+1) N-bit string of an initial block, which is referred to as the 0-th block, into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

f) computing a set of cipher points as
$(x_{0,c_0}, x_{1,c_0}, \ldots, x_{nx,c_0}, y_{0,c_0}, y_{1,c_0}, \ldots, y_{ny,c_0}) =$
$(x_{0,m_0}, x_{1,m_0}, \ldots, x_{nx,m_0}, y_{0,m_0}, y_{1,m_0}, \ldots, y_{ny,m_0})$
$+(x_{0,S_0}, x_{1,S_0}, \ldots, x_{nx,S_0}, y_{0,S_0}, y_{1,S_0}, \ldots, x_{ny,S_0})$
and
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) =$
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the message point of the 0-th block is on the elliptic polynomial, where $\alpha_{m_0}=1$, wherein if otherwise, the set of cipher points are computed as
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) =$
$(x_{0,m_0}, x_{1,m_0}, \ldots, x_{nx,m_0}, \sqrt{\alpha}y_{0,m_0}, y_{1,m_0}, \ldots, y_{ny,m_0})$
$+(x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

g) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ (of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent;

h) establishing integers i and u and iteratively repeating the following steps i) through k) until i>u:

i) embedding the message (nx+ny+1) N-bit string of an i-th block into the (nx+1) x-coordinates $x_0, x_1, \ldots, x_{nx}$, and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

j) computing the set of cipher points as
$(x_{0,c_i}, x_{1,c_i}, \ldots, x_{nx,c_i}, y_{0,c_i}, y_{1,c_i}, \ldots, y_{ny,c_i}) =$
$(x_{0,m_i}, x_{1,m_i}, \ldots, x_{nx,m_i}, y_{0,m_i}, y_{1,m_i}, \ldots, y_{ny,m_i})$
$+(x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) =$
$(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$
if the message point of the i-th block is on the elliptic polynomial, where $\alpha_{m_i}=1$, wherein if otherwise, the set of cipher points are computed as $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) =$
$(x_{0,m_i}, x_{1,m_i}, \ldots, x_{nx,m_i}, \sqrt{\alpha} y_{0,m_i}, y_{1,m_i}, \ldots, y_{ny,m_i})$
$+ (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$
and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;

k) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i})$ are sent to the receiving correspondent;

the receiving correspondent then performs the following steps:

l) embedding the bit string of the secret key into the (nx+1) x-coordinates $x_0, x_1, \ldots, x_{nx}$ and the ny y-coordinates $y_1, \ldots, y_{ny}$ of the key elliptic point $(x_{0,k}, x_{1,k}, \ldots, x_{nx,k}, \sqrt{\alpha_k} y_{0,k}, y_{1,k}, \ldots, y_{ny,k})$;

m) computing a scalar multiplication
$(x_{0,TS_0}, x_{1,TS_0}, \ldots, x_{nx,TS_0}, \sqrt{\alpha} y_{0,TS_0}, y_{1,TS_0}, \ldots, y_{ny,TS_0}) = k(x_{0,TB}, x_{1,TB}, \ldots, x_{nx,TB}, \sqrt{\alpha} y_{0,B}, y_{1,TB}, \ldots, y_{ny,TB})$
if $(x_{0,k}, x_{1,k}, \ldots, x_{nx,k}, \sqrt{\alpha_k} y_{0,k}, y_{1,k}, \ldots, y_{ny,k})$ is on the elliptic polynomial, where $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, wherein
if $\alpha_k = \overline{\alpha}$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = (x_{0,k}, x_{1,k}, \ldots, x_{nx,k}, \sqrt{\alpha} y_{0,k}, y_{1,k}, \ldots, y_{ny,k})$;

n) computing a message point $(x_{0,m_0}, x_{1,m_0}, \ldots, x_{nx,m_0}, y_{0,m_0}, y_{1,m_0}, \ldots, y_{ny,m_0})$ as
$(x_{0,m_0}, x_{1,m_0}, \ldots, x_{nx,m_0}, y_{0,m_0}, y_{1,m_0}, \ldots, y_{ny,m_0}) =$
$(x_{0,c_0}, x_{1,c_0}, \ldots, x_{nx,c_0}, y_{0,c_0}, y_{1,c_0}, \ldots, y_{ny,c_0})$
$- (x_{0,S_0}, x_{1,S_0}, \ldots, x_{nx,S_0}, y_{0,S_0}, y_{1,S_0}, \ldots, y_{ny,S_0})$
and setting
$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha} y_{0,TS_0}, y_{1,TS_0}, \ldots, x_{ny,TS_0})$
if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha} y_{0,m_0}, y_{1,m_0}, \ldots, y_{ny,m_0})$ is computed as
$(x_{0,m_0}, x_{1,m_0}, \ldots, x_{nx,m_0}, \sqrt{\alpha} y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0})$
$- (x_{0,TS_0}, x_{1,TS_0}, \ldots, x_{nx,TS_0}, \sqrt{\alpha} y_{0,TS_0}, y_{1,TS_0}, \ldots, x_{ny,TS_0})$
and $(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, y_{ny,S_0})$;

o) recovering the secret message bit string of 0-th block from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha} y_{0,m_0}, y_{1,m_0}, \ldots, y_{ny,m_0})$ if the message point is on the twist of the elliptic polynomial;

p) setting i=0 and iteratively repeating the following steps q) through r) until i>u:

q) computing the message point $(x_{0,m_i}, x_{1,m_i}, \ldots, x_{nx,m_i}, \sqrt{\alpha} y_{0,m_i}, y_{1,m_i}, \ldots, y_{ny,m_i})$ as
$(x_{0,m_i}, x_{1,m_i}, \ldots, x_{nx,m_i}, y_{0,m_i}, y_{1,m_i}, \ldots, y_{ny,m_i}) =$
$(x_{0,c_i}, x_{1,c_i}, \ldots, x_{nx,c_i}, y_{0,c_i}, y_{1,c_i}, \ldots, y_{ny,c_i})$
$- (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$
and $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$;

if the received cipher point of the i-th block $(x_{0,c_i}, x_{1,c_i}, \ldots, x_{nx,c_i}, y_{0,c_i}, y_{1,c_i}, \ldots, y_{ny,c_i})$ is on the elliptic polynomial, wherein if the received cipher point $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha} y_{0,m_i}, y_{1,m_i}, \ldots, y_{ny,m_i})$ is computed as
$(x_{0,m_i}, x_{1,m_i}, \ldots, x_{nx,m_i}, \sqrt{\alpha} y_{0,m_i}, y_{1,m_i}, \ldots, y_{ny,m_i}) =$
$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i})$
$- (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$
and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,S_i}, \ldots, x_{ny,c_{i-1}})$;
and r) recovering the secret message bit string of i-th block from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha} y_{0,m_i}, y_{1,m_i}, \ldots, y_{ny,m_i})$ if the message point is on the twist of the elliptic polynomial.

2. The computerized method of cipher block chaining using elliptic polynomial cryptography as recited in claim 1, wherein the step of embedding includes the steps of:

a) dividing the message bit string into (nx+ny+1) bit-strings $m_{x,0}, m_{x,1}, \ldots, m_{x,nx}, m_{y,1}, \ldots, m_{k,ny}$, wherein the length of string $m_{x,0}$ is less than or equal to (N−L) bits, and the length of each of the other bit-strings are each less than or equal to N bits, wherein each of the (nx+ny+1) bit strings has an equivalent value which is an element of the underlying field F;

b) assigning the value of the bit string of $m_{x,1}, m_{x,2}, \ldots, m_{x,nx}$ to $x_{1,m}, x_{2,m}, \ldots, x_{nx,m}$;

c) assigning the value of the bit string of $m_{y,1}, \ldots, m_{k,ny}$ to $y_{1,m}, \ldots, y_{ny,m}$;

d) assigning the value of the bit string of $m_{x,0}$ to $x_0$;

e) substituting the values of $x_0, x_1, \ldots, x_{nx}$ and $y_1, \ldots, y_{ny}$ in a selected elliptic polynomial equation with (nx+1) x-coordinates and (ny+1) y-coordinates to form a quadratic equation in $y_0$ of the form $y_0^2 + A y_0 + B = 0$;

f) if the quadratic equation in $y_0$ has solutions $\overline{y}_{0,1}, \overline{y}_{0,2}$ wherein the solutions are elements of the finite field F, then assigning one of the solutions to $y_0$ randomly, the message point being given by $(x_{0,m}, x_{1,m}, \ldots, x_{nx,m}, y_{0,m}, y_{1,m}, \ldots, y_{ny,m})$, otherwise assigning one of the solutions $\sqrt{\alpha} y_{0,1}, \sqrt{\alpha} y_{0,2}$ to $y_0$ randomly, the message point being given by $(x_{0,m}, x_{1,m}, \ldots, x_{nx,m}, \sqrt{\alpha} y_{0,m}, y_{1,m}, \ldots, y_{ny,m})$; and g) the message point being embedded as $(x_{0,m}, x_{1,m}, \ldots, x_{nx,m}, \sqrt{\alpha} y_{0,m}, y_{1,m}, \ldots, y_{ny,m})$, where the message point is on the elliptic polynomial if $\alpha_{m_i} = 1$, and the point is on the twist of the elliptic polynomial if $\alpha_{m_i} = \overline{\alpha}$.

3. A computerized method of cipher block chaining using elliptic polynomial cryptography, comprising the steps of:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ and a base point on the twist of the elliptic polynomial $(x_{0,TB}, x_{1,TB}, \ldots, x_{nx,TB}, \sqrt{\alpha}y_{0,TB}, y_{1,TB}, \ldots, y_{ny,TB}) \in TEC^{nx+ny+2}$;

the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$ of a key elliptic point $(x_{0,k}, x_{1,k}, \ldots, x_{nx,k}, \sqrt{\alpha_k}y_{0,k}, y_{1,k}, \ldots, y_{ny,k})$;

d) computing a scalar multiplication $(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$ if $(x_{0,k}, x_{1,k}, \ldots, x_{nx,k}, \sqrt{\alpha_k}y_{0,k}, y_{1,k}, \ldots, y_{ny,k})$ is on the elliptic polynomial, wherein $\alpha_k = 1$, and setting $(x_{0,S_0}, x_{1,S_0}, \ldots, x_{nx,S_0}, y_{0,S_0}, y_{1,S_0}, \ldots, y_{ny,S_0}) = (x_{0,k}, x_{1,k}, \ldots, x_{nx,k}, y_{0,k}, y_{1,k}, \ldots, y_{ny,k})$, wherein if $\alpha_k = \alpha_o$, then computing a scalar multiplication $(x_{0,S_0}, x_{1,S_0}, \ldots, x_{nx,S_0}, y_{0,S_0}, y_{1,S_0}, \ldots, y_{ny,S_0}) = k(x_{0,B}, x_{1,B}, \ldots, x_{nx,B}, y_{0,B}, y_{1,B}, \ldots, y_{ny,B})$ and setting $(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) = (x_{0,k}, x_{1,k}, \ldots, x_{nx,k}, \sqrt{\alpha}y_{0,k}, y_{1,k}, \ldots, y_{ny,k})$;

e) embedding the message (nx+ny+1) N-bit string of an initial block, which is referred to as the 0-th block, into the x-coordinate of an elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

f) computing a set of cipher points as $(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) (x_{0,S_0}, x_{1,S_0}, \ldots, x_{nx,S_0}, y_{0,S_0}, y_{1,S_0}, \ldots, y_{ny,S_0})$ and $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, y_{ny,TS_0})$ if the message point of the 0-th block is on the elliptic polynomial, where $\alpha_{m_0} = 1$, wherein if otherwise, the set of cipher points are computed as $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha}y_{0,m_0}, y_{1,m_0}, \ldots, y_{ny,m_0}) + (x_{0,TS_0}, x_{1,TS_0}, \ldots, x_{nx,TS_0}, y_{0,TS_0}, y_{1,TS_0}, \ldots, x_{ny,TS_0})$ and $(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, y_{ny,S_0})$;

g) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent;

h) establishing integers i and u and iteratively repeating the following steps i) through l) until $i > u$:

i) embedding the message (nx+ny+1) N-bit string of an i-th block into the (nx+1) x-coordinates $x_0, x_1, \ldots, x_{nx}$, and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

j) doubling the points $(x_{0,S_i}, x_{1,S_i}, \ldots, x_{nx,S_i}, y_{0,S_i}, y_{1,S_i}, \ldots, y_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$ as $(x_{0,S_i}, x_{1,S_i}, \ldots, x_{nx,S_i}, y_{0,S_i}, y_{1,S_i}, \ldots, y_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, y_{ny,S_{i-1}})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$, respectively;

k) computing the set of cipher points as $(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ if the message point of the i-th block is on the elliptic polynomial, where $\alpha_{m_i} = 1$, wherein if otherwise, the set of cipher points are computed as $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;

l) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ are sent to the receiving correspondent;

the receiving correspondent then performs the following steps:

m) embedding the bit string of the secret key into the (nx+1) x-coordinates $x_0, x_1, \ldots, x_{nx}$ and the ny y-coordinates $y_1, \ldots, y_{ny}$ of the key elliptic point $(x_{0,k}, x_{1,k}, \ldots, x_{nx,k}, \sqrt{\alpha_k}y_{0,k}, y_{1,k}, \ldots, y_{ny,k})$;

n) computing a scalar multiplication $(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$ if $(x_{0,k}, x_{1,k}, \ldots, x_{nx,k}, \sqrt{\alpha_k}y_{0,k}, y_{1,k}, \ldots, y_{ny,k})$ is on the elliptic polynomial, where $\alpha_k = 1$, and setting $(x_{0,S_0}, x_{1,S_0}, \ldots, x_{nx,S_0}, y_{0,S_0}, y_{1,S_0}, \ldots, y_{ny,S_0}) = (x_{0,k}, x_{1,k}, \ldots, x_{nx,k}, y_{0,k}, y_{1,k}, \ldots, y_{ny,k})$, wherein if $\alpha_k = \alpha$, then computing a scalar multiplication $(x_{0,S_0}, x_{1,S_0}, \ldots, x_{nx,S_0}, y_{0,S_0}, y_{1,S_0}, \ldots, y_{ny,S_0}) = k(x_{0,B}, x_{1,B}, \ldots, x_{nx,B}, y_{0,B}, y_{1,B}, \ldots, y_{ny,B})$ and setting $(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

o) computing a message point $(x_{0,m_0}, x_{1,m_0}, \ldots, x_{nx,m_0}, y_{0,m_0}, y_{1,m_0}, \ldots, y_{ny,m_0})$ as $(x_{0,m_0}, x_{1,m_0}, \ldots, x_{nx,m_0}, y_{0,m_0}, y_{1,m_0}, \ldots, y_{ny,m_0}) =$
$(x_{0,c_0}, x_{1,c_0}, \ldots, x_{nx,c_0}, \sqrt{\alpha}y_{0,c_0}, y_{1,c_0}, \ldots, y_{ny,c_0})$
$-(x_{0,S_0}, x_{1,S_0}, \ldots, x_{nx,S_0}, \sqrt{\alpha}y_{0,S_0}, y_{1,S_0}, \ldots, x_{ny,S_0})$ and setting $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = x_{0,TS_0}, x_{1,TS_0}, \ldots, x_{nx,TS_0}, \sqrt{\alpha}y_{0,TS_0}, y_{1,TS_0}, \ldots, x_{ny,TS_0})$ if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha}y_{0,m_0}, y_{1,m_0}, \ldots, y_{ny,m_0})$ is computed as $(x_{0,m_0}, x_{1,m_0}, \ldots, x_{nx,m_0}, \sqrt{\alpha}y_{0,m_0}, y_{1,m_0}, \ldots, y_{ny,m_0}) =$
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$
$-(x_{0,TS_0}, x_{1,TS_0}, \ldots, x_{nx,TS_0}, \sqrt{\alpha}y_{0,TS_0}, y_{1,TS_0}, \ldots, x_{ny,TS_0})$ and $(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

p) recovering the secret message bit string of 0-th block from the (nx+1) x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha}y_{0,m_0}, y_{1,m_0}, \ldots, y_{ny,m_0})$ if the message point is on the twist of the elliptic polynomial;

q) setting i=0 and iteratively repeating the following steps r) through t) until i>u:

r) doubling the points $(x_{0,S_i}, x_{1,S_i}, \ldots, x_{nx,S_i}, y_{0,S_i}, y_{1,S_i}, \ldots, y_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, y_{ny,TS_i})$ as $(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$, respectively;

s) computing the message point $(x_{0,m_i}, x_{1,m_i}, \ldots, x_{nx,m_i}, y_{0,m_i}, y_{1,m_i}, \ldots, y_{ny,m_i})$ as $(x_{0,m_i}, x_{1,m_i}, \ldots, x_{nx,m_i}, y_{0,m_i}, y_{1,m_i}, \ldots, y_{ny,m_i}) =$
$(x_{0,c_i}, x_{1,c_i}, \ldots, x_{nx,c_i}, y_{0,c_i}, y_{1,c_i}, \ldots, y_{ny,c_i})$
$-(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ if the received cipher point of the i-th block $(x_{0,c_i}, x_{1,c_i}, \ldots, x_{nx,c_i}, y_{0,c_i}, y_{1,c_i}, \ldots, y_{ny,c_i})$ is on the elliptic polynomial, wherein if the received cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, y_{0,m_i}, y_{1,m_i}, \ldots, y_{ny,m_i})$ is computed as $(x_{0,m_i}, x_{1,m_i}, \ldots, x_{nx,m_i}, \sqrt{\alpha}y_{0,m_i}, y_{1,m_i}, \ldots, y_{ny,m_i}) =$
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$
$-(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$;

and t) recovering the secret message bit string of i-th block from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha}y_{0,m_i}, y_{1,m_i}, \ldots, y_{ny,m_i})$ if the message point is on the twist of the elliptic polynomial.

4. The computerized method of cipher block chaining using elliptic polynomial cryptography as recited in claim 3, wherein the step of embedding includes the steps of:

a) dividing the message bit string into (nx+ny+1) bit-strings $m_{x,0}, m_{x,1}, \ldots, m_{x,nx}, m_{y,1}, \ldots, m_{k,ny}$, wherein the length of string $m_{x,0}$ is less than or equal to (N−L) bits, and the length of each of the other bit-strings are each less than or equal to N bits, wherein each of the (nx+ny+1) bit strings has an equivalent value which is an element of the underlying field F;

b) assigning the value of the bit string of $m_{x,1}, m_{x,2}, \ldots, m_{x,nx}$ to $x_{1,m}, x_{2,m}, \ldots, x_{nx,m}$;

c) assigning the value of the bit string of $m_{y,1}, \ldots m_{k,ny}$ to $y_{1,m}, \ldots, y_{ny,m}$;

d) assigning the value of the bit string of $m_{x,0}$ to $x_0$;

e) substituting the values of $x_0, x_1, \ldots, x_{nx}$ and $y_1, \ldots, y_{ny}$ in a selected elliptic polynomial equation with (nx+1) x-coordinates and (ny+1) y-coordinates to form a quadratic equation in $y_0$ of the form $y_0^2 + Ay_0 + B = 0$;

f) if the quadratic equation in $y_0$ has solutions $\bar{y}_{0,1}, \bar{y}_{0,2}$, wherein the solutions are elements of the finite field F, then assigning one of the solutions to $y_0$ randomly, the message point being given by $(x_{0,m}, x_{1,m}, \ldots, x_{nx,m}, y_{0,m}, y_{1,m}, \ldots, y_{ny,m})$, otherwise assigning one of the solutions $\sqrt{\alpha}y_{0,1}, \sqrt{\alpha}y_{0,2}$ to $y_0$ randomly, the message point being given by $(x_{0,m}, x_{1,m}, \ldots, x_{nx,m}, \sqrt{\alpha}y_{0,m}, y_{1,m}, \ldots, y_{ny,m})$; and g) the message point being embedded as $(x_{0,m_0}, x_{1,m_0}, \ldots, x_{nx,m_0}, \sqrt{\alpha}y_{0,m_0}, y_{1,m_0}, \ldots, y_{ny,m_0})$, where the message point is on the elliptic polynomial if $\alpha_{m_i} = 1$, and the point is on the twist of the elliptic polynomial if $\alpha_{m_i} = \alpha$.

5. A computerized method of cipher block chaining using elliptic polynomial cryptography, comprising the steps of:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic polynomial $(x_{0,B}, x_{1,B}, \ldots, x_{nx,B}, \sqrt{\alpha}y_{0,B}, y_{1,B}, \ldots, y_{ny,B}) \in EC^{nx+ny+2}$ and a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in TEC^{nx+ny+2}$, the sending and receiving correspondents further agreeing upon the number of message bits and their positions to be inserted in the (nx+ny+1) N-bit blocks to be encrypted, wherein $N_m$ represents the number of bits to be inserted in the (nx+ny+1) N-bit block, where $N_m < (nx+ny+1)N$;

the sending correspondent then performs the following steps:

c) embedding a bit string of the secret key into the (nx+1) x-coordinates $x_0, x_1, \ldots, x_{nx}$ and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$;

d) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, y_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, wherein $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, \sqrt{\alpha}y_{0,k}, y_{1,k}, \ldots, y_{ny,k})$, wherein
if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

e) generating $((nx+ny+1)N-N_m)$ bits at random using an $((nx+ny+1)N-N_m)$-bit random number generator and forming a block to be encrypted $B_{m_0}$ by inserting the $N_m$ message bits of the initial block and the random $((nx+ny+1)N-N_m)$ bits in the appropriate positions of the block;

f) embedding the tagged message $(nx+ny+1)$ N-bit string of the 0-th block into the x-coordinate of an elliptic message point
$(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$;

g) computing a set of cipher points as
$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, y_{ny,S_0})$
and
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the message point of the 0-th block is on the elliptic polynomial, where $\alpha_{m_0} = 1$, wherein if otherwise, the set of cipher points are computed as
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha}y_{0,m_0}, y_{1,m_0}, \ldots, y_{ny,m_0}) + (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

h) sending appropriate bits of the x-coordinates $c_{0,c}, x_{1,c}, \ldots, x_{nx,c}$ and the y-coordinates $y_{1,c}, \ldots, y_{ny,c}$ of the cipher point $(x_{0,c_0}, x_{1,c_0}, \ldots, x_{nx,c_0}, y_{0,c_0}, y_{1,c_0}, \ldots, y_{ny,c_0})$ to the receiving correspondent if the message point of the 0-th block is on the elliptic polynomial, wherein if the message point of the 0-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ are sent to the receiving correspondent;

i) establishing integers i and u and iteratively repeating the following steps j) through m) until i>u:

j) generating $((nx+ny+1)N-N_m)$ bits at random using the $((nx+ny+1)N-N_m)$-bit random number generator and forming a block to be encrypted $B_{m_i}$ by inserting the $N_m$ message bits of an i-th block and the random $((nx+ny+1)N-N_m)$ bits in the appropriate positions of the block;

k) embedding the tagged message $(nx+ny+1)$ N-bit string of the i-th block into the $(nx+1)$ x-coordinates $x_0, x_1, \ldots, x_{nx}$ and the ny y-coordinates $y_1, \ldots, y_{ny}$ of the elliptic message point
$(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$;

l) computing the set of cipher points as
$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$
and
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
if the message point of the i-th block is on the elliptic polynomial, where $\alpha_{m_i} = 1$, wherein if otherwise, the set of cipher points are computed as
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$
and
$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$;

m) sending appropriate bits of the x-coordinates $x_{0,c}, x_{1,c}, \ldots, x_{nx,c}$ and the y-coordinates $y_{1,c}, \ldots, y_{ny,c}$ of the cipher point $(x_{0,c_i}, x_{1,c_i}, \ldots, x_{nx,c_i}, y_{0,c_i}, y_{1,c_i}, \ldots, y_{ny,c_i})$ to the receiving correspondent if the message point of the i-th block is on the elliptic polynomial, wherein if the message point of the i-th block is on the twist of the elliptic polynomial, the appropriate bits of the x-coordinates $x_{0,Tc}, x_{1,Tc}, \ldots, x_{nx,Tc}$ and y-coordinates $y_{1,Tc}, \ldots, y_{ny,Tc}$ of the cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ are sent to the receiving correspondent;

the receiving correspondent then performs the following steps:

n) embedding the bit string of the secret key into the $(nx+1)$ x-coordinates $x_0, x_1, \ldots, x_{nx}$ and the ny y-coordinates $y_1, \ldots, y_{ny}$ of a key elliptic point $(x_{0,k}, x_{1,k}, \ldots, x_{nx,k}, \sqrt{\alpha_k}y_{0,k}, y_{1,k}, \ldots, y_{ny,k})$;

o) computing a scalar multiplication
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$
if $(x_{0,k}, x_{1,k}, \ldots, x_{nx,k}, \sqrt{\alpha_k}y_{0,k}, y_{1,k}, \ldots, y_{ny,k})$ is on the elliptic polynomial, where $\alpha_k = 1$, and setting
$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$,
wherein if $\alpha_k = \alpha_o$, then computing a scalar multiplication
$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$
and setting
$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

p) computing a message point $(x_{0,m_0}, x_{1,m_0}, \ldots, x_{nx,m_0}, y_{0,m_0}, y_{1,m_0}, \ldots, y_{ny,m_0})$ as
$(x_{0,m_0}, x_{1,m_0}, \ldots, x_{nx,m_0}, y_{0,m_0}, y_{1,m_0}, \ldots, y_{ny,m_0}) = (x_{0,c_0}, x_{1,c_0}, \ldots, x_{nx,c_0}, y_{0,c_0}, y_{1,c_0}, \ldots, y_{ny,c_0}) - (x_{0,S_0}, x_{1,S_0}, \ldots, x_{nx,S_0}, y_{0,S_0}, y_{1,S_0}, \ldots, x_{ny,S_0})$
and setting
$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
if the received cipher point of the 0-th block $(x_{0,c_0}, x_{1,c_0}, \ldots, x_{nx,c_0}, y_{0,c_0}, y_{1,c_0}, \ldots, y_{ny,c_0})$ is on the elliptic polynomial, wherein if the received cipher point $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0})$ is on the twist of the elliptic polynomial, the message point $(x_{0,m_0}, x_{1,m_0}, \ldots, x_{nx,m_0}, \sqrt{\alpha}y_{0,m_0}, y_{1,m_0}, \ldots, y_{ny,m_0})$ is computed as
$(x_{0,m_0}, x_{1,m_0}, \ldots, x_{nx,m_0}, \sqrt{\alpha}y_{0,m_0}, y_{1,m_0}, \ldots, y_{ny,m_0}) = (x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) - (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$
and
$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

q) recovering the bit string of 0-th block $B_{m_0}$ from the $(nx+1)$ x-coordinates and the ny y-coordinates of the point $(x_{0,m_0}, x_{1,m_0}, \ldots, x_{nx,m_0}, y_{0,m_0}, y_{1,m_0}, \ldots, y_{ny,m_0})$ if the message point is on the elliptic polynomial, wherein the secret message bit string of the 0-th block is recovered from the (nx+1) x-coordinates and the ny y-coordinates of the point $(x_{0,m_0}, x_{1,m_0}, \ldots, x_{nx,m_0}, \sqrt{\alpha}y_{0,m_0}, y_{1,m_0}, \ldots, y_{ny,m_0})$ if the message point is on the twist of the elliptic polynomial;

r) setting i=0 and iteratively repeating the following steps s) through t) until i>u:

s) computing the message point $(x_{0,m_i}, x_{1,m_i}, \ldots, x_{nx,m_i}, y_{0,m_i}, y_{1,m_i}, \ldots, y_{ny,m_i})$ as $(x_{0,m_i}, x_{1,m_i}, \ldots, x_{nx,m_i}, y_{0,m_i}, y_{1,m_i}, \ldots, y_{ny,m_i}) = (x_{0,c_i}, x_{1,c_i}, \ldots, x_{nx,c_i}, y_{0,c_i}, y_{1,c_i}, \ldots, y_{ny,c_i})$
$-(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ if the received cipher point $(x_{0,c_i}, x_{1,c_i}, \ldots, x_{nx,c_i}, y_{0,c_i}, y_{1,c_i}, \ldots, y_{ny,c_i})$ of the i-th block $(x_{c_i}, y_{c_i})$ is on the elliptic polynomial, wherein if the received cipher point $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$ is on the twist of the elliptic polynomial, the message point $(x_{0,m_i}, x_{1,m_i}, \ldots, x_{nx,m_i}, \sqrt{\alpha}y_{0,m_i}, y_{1,m_i}, \ldots, y_{ny,m_i})$ is computed as $(x_{0,m_i}, x_{1,m_i}, \ldots, x_{nx,m_i}, \sqrt{\alpha}y_{0,m_i}, y_{1,m_i}, \ldots, y_{ny,m_i}) = (x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})$
$-(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$;

and t) recovering the bit string of i-th block $B_m$, from the (nx+1) x-coordinates and the ny y-coordinates of the point $(x_{0,m_i}, x_{1,m_i}, \ldots, x_{nx,m_i}, y_{0,m_i}, y_{1,m_i}, \ldots, y_{ny,m_i})$ if the message point is on the elliptic polynomial, wherein the secret message bit string of the i-th block is recovered from the (nx+1) x-coordinates and the ny y-coordinates of the point $(x_{0,m_i}, x_{1,m_i}, \ldots, x_{nx,m_i}, \sqrt{\alpha}y_{0,m_i}, y_{1,m_i}, \ldots, y_{ny,m_i})$ if the message point is on the twist of the elliptic curve.

6. The computerized method of cipher block chaining using elliptic polynomial cryptography as recited in claim 5, wherein the step of embedding includes the steps of:

a) dividing the message bit string into (nx+ny+1) bit-strings $m_{x,0}, m_{x,1}, \ldots, m_{x,nx}, m_{y,1}, \ldots, m_{k,ny}$, wherein the length of string $m_{x,0}$ is less than or equal to (N–L) bits, and the length of each of the other bit-strings are each less than or equal to N bits, wherein each of the (nx+ny+1) bit strings has an equivalent value which is an element of the underlying field F;

b) assigning the value of the bit string of $m_{x,1}, m_{x,2}, \ldots, m_{x,nx}$ to $x_{1,m}, x_{2,m}, \ldots, x_{nx,m}$;

c) assigning the value of the bit string of $m_{y,1}, \ldots, m_{k,ny}$ to $y_{1,m}, \ldots, y_{ny,m}$;

d) assigning the value of the bit string of $m_{x,0}$ to $x_0$;

e) substituting the values of $x_0, x_1, \ldots, x_{nx}$ and $y_1, \ldots, y_{ny}$ in a selected elliptic polynomial equation with (nx+1) x-coordinates and (ny+1) y-coordinates to form a quadratic equation in $y_0$ of the form $y_0^2 + Ay_0 + B = 0$;

f) if the quadratic equation in $y_0$ has solutions $\bar{y}_{0,1}, \bar{y}_{0,2}$, wherein the solutions are elements of the finite field F, then assigning one of the solutions to $y_0$ randomly, the message point being given by $(x_{0,m}, x_{1,m}, \ldots, x_{nx,m}, y_{0,m}, y_{1,m}, \ldots, y_{ny,m})$, otherwise assigning one of the solutions $\sqrt{\alpha}y_{0,1}, \sqrt{\alpha}y_{0,2}$ to $y_0$ randomly, the message point being given by $(x_{0,m}, x_{1,m}, \ldots, x_{nx,m}, \sqrt{\alpha}y_{0,m}, y_{1,m}, \ldots, y_{ny,m})$; and g) the message point being embedded as $(x_{0,m}, x_{1,m}, \ldots, x_{nx,m}, \sqrt{\alpha}y_{0,m}, y_{1,m}, \ldots, y_{ny,m})$, where the message point is on the elliptic polynomial if $\alpha_{m_i} = 1$, and the point is on the twist of the elliptic polynomial if $\alpha_{m_i} = \bar{\alpha}$.

\* \* \* \* \*